US005793661A

United States Patent [19]
Dulong et al.

[11] Patent Number: 5,793,661
[45] Date of Patent: Aug. 11, 1998

[54] METHOD AND APPARATUS FOR PERFORMING MULTIPLY AND ACCUMULATE OPERATIONS ON PACKED DATA

[75] Inventors: Carole Dulong, Saratoga; Larry Mennemeier, Boulder Creek, both of Calif.; Tuan H. Bui, Phoenix, Ariz.; Eiichi Kowashi, Ryugasaki, Japan; Alexander D. Peleg; Benny Eitan, both of Haifa, Israel; Stephen A. Fischer, Rancho Cordova, Calif.; Benny Maytal, Mevaseret, Israel; Millind Mittal, South San Francisco, Calif.

[73] Assignee: Intel Corporation, Santa Clara, Calif.

[21] Appl. No.: 578,827

[22] Filed: Dec. 26, 1995

[51] Int. Cl.$^6$ ................................................ G06F 7/00
[52] U.S. Cl. ........................................................ 364/750.5
[58] Field of Search ...................... 364/736.01, 736.02, 364/736.04, 736.05, 748.01, 748.07, 748.09, 749, 754.01, 757, 758, 750.5

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,707,800 | 11/1987 | Montrone et al. | 364/788 |
| 4,771,379 | 9/1988 | Ando et al. | 364/200 |
| 4,989,168 | 1/1991 | Kuroda et al. | 364/715.09 |
| 5,095,457 | 3/1992 | Jeong | 364/758 |
| 5,187,679 | 2/1993 | Vassiliadis | 364/786 |
| 5,442,499 | 8/1995 | Murakami et al. | 364/758 X |

OTHER PUBLICATIONS

J. Shipnes, *Graphics Processing with the 88110 RISC Microprocessor*, IEEE (1992), pp. 169–174.

*MC88110 Second Generation RISC Microprocessor User's Manual*, Motorola Onc. (1991).

*Errata to MC88110 Second Generation RISC Microprocessor User's Manual*, Motorola Inc. (1992), pp. 1–11.

*MC88110 Programmer's Reference Guide*, Motorola Inc. (1992), pp. 1–4.

*i860™ Microprocessor Family Programmer's Reference Manual*, Intel Corporation (1992), Ch. 1, 3, 8, 12.

R. B. Lee, *Accelerating Multimedia With Enhanced Microprocessors*, IEEE Micro (Apr. 1995), pp. 22–32.

*TMS320C2x User's Guide*, Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video*, Microprocessor Report (Jan. 1994), pp. 16, 17.

SPARC Technology Business, *UltraSPARC Multimedia Capabilities On–Chip Support for Real–Time Video and Advanced Graphics*, Sun Microsystems (Sep. 1994).

Y. Kawakami et al., *LSI Applications: A Single–Chip Digital Signal Processor for Voiceband Applications*, Solid State Circuits Conference, Digest of Technical Papers; IEEE International (1980).

(List continued on next page.)

*Primary Examiner*—Chuong Dinh Ngo
*Attorney, Agent, or Firm*—Blakely, Sokoloff, Taylor & Zafman

[57] ABSTRACT

A method of multiplying and accumulating two sets of values in a computer system. A packed multiply add is performed on a first portion of a first set of values packed into a first source and a first portion of a second set of values packed into a second source to generate a first result. The first result is unpacked into a plurality of values (e.g. two). The plurality of values is then added together to form a resulting accumulation value.

21 Claims, 28 Drawing Sheets

OTHER PUBLICATIONS

B. Case, *Philips Hopes to Displace DSPs with VLIW*, Microprocessor Report (Dec. 1994), pp. 12–18.

N. Margulis, *i860 Microprocessor Architecture*, McGraw Hill, Inc. (1990) Ch. 6, 7, 8, 10, 11.

*Pentium Processor User's Manual, Vol. 3; Architecture and Programming Manual*, Intel Coprporation (1993), Ch. 1, 3, 4, 6, 8, and 18.

MULTIPLY-ADD SOURCE 1, SOURCE 2

| 0 | 0 | $A_1$ | $A_2$ | SOURCE 1 |
|---|---|---|---|---|
| 0 | 0 | $B_1$ | $B_2$ | SOURCE 2 |
| = | | | | |
| 0 | | $A_1B_1 + A_2B_2$ | | RESULT 1 |

FIG. 10A

MULTIPLY-ADD SOURCE 3, SOURCE 4

| 0 | 0 | $A_3$ | $A_4$ | SOURCE 3 |
|---|---|---|---|---|
| 0 | 0 | $B_3$ | $B_4$ | SOURCE 4 |
| = | | | | |
| 0 | | $A_3A_4 + B_3B_4$ | | RESULT 2 |

FIG. 10B

UNPACKED ADD RESULT 1, RESULT 2

| 0 | $A_1B_1 + A_2B_2$ | RESULT 1 |
|---|---|---|
| 0 | $A_3A_4 + B_3B_4$ | RESULT 2 |
| = | | |
| 0 | $A_1B_1 + A_2B_2 + A_3A_4 + B_3B_4$ | RESULT 3 |

FIG. 10C

MULTIPLY-ADD SOURCE 1, SOURCE 2

| $A_1$ | $A_2$ | $A_3$ | $A_4$ | SOURCE 1 |
|---|---|---|---|---|
| $B_1$ | $B_2$ | $B_3$ | $B_4$ | SOURCE 2 |
| = | | | | |
| $A_1B_1 + A_2B_2$ | | $A_3B_3 + A_4B_4$ | | RESULT 1 |

FIG. 13A

UNPACK HIGH RESULT + 1

| $A_1B_1 + A_2B_2$ | $A_3B_3 + A_4B_4$ | RESULT 1 |
|---|---|---|
| 0 | 0 | |
| = | | |
| 0 | $A_1B_1 + A_2B_2$ | RESULT 2 |

FIG. 13B

UNPACK LOW RESULT + 1

| $A_1B_1 + A_2B_2$ | $A_3B_3 + A_4B_4$ | RESULT 1 |
|---|---|---|
| 0 | 0 | |
| = | | |
| 0 | $A_3B_3 + A_4B_4$ | RESULT 3 |

FIG. 13C

UNPACKED ADD RESULT 2, RESULT 3

| 0 | $A_1B_1 + A_2B_2$ | RESULT 2 |
|---|---|---|
| 0 | $A_3B_3 + A_4B_4$ | RESULT 3 |
| = | | |
| $A_1B_1 + A_2B_2 + A_3B_3 + A_4B_4$ | | RESULT 4 (ACCUMULATION VALUE) |

MULTIPLY-ADD SOURCE 1, SOURCE 2

| $A_1$ | $A_2$ | $A_3$ | $A_4$ | SOURCE 1 |
|---|---|---|---|---|
| $B_1$ | $B_2$ | $B_3$ | $B_4$ | SOURCE 2 |
| = | | | | |
| $A_1B_1 + A_2B_2$ | | $A_3B_3 + A_4B_4$ | | RESULT 1 |

FIG. 16A

MULTIPLY-ADD SOURCE 3, SOURCE 4

| $A_5$ | $A_6$ | $A_7$ | $A_8$ | SOURCE 3 |
|---|---|---|---|---|
| $B_5$ | $B_6$ | $B_7$ | $B_8$ | SOURCE 4 |
| = | | | | |
| $A_5B_5 + A_6B_6$ | | $A_7B_7 + A_8B_8$ | | RESULT 2 |

FIG. 16B

PACKED ADD RESULT 1, RESULT 2

| $A_1B_1 + A_2B_2$ | $A_3B_3 + A_4B_4$ | RESULT 1 |
|---|---|---|
| $A_5B_5 + A_6B_6$ | $A_7B_7 + A_8B_8$ | RESULT 2 |
| = | | |
| $A_1B_1 + A_2B_2 + A_5B_5 + A_6B_6$ | $A_3B_3 + A_4B_4 + A_7B_7 + A_8B_8$ | RESULT 3 |

FIG. 16C

UNPACK HIGH RESULT 3, SOURCE 5

| $A_1B_1 + A_2B_2 + A_5B_5 + A_6B_6$ | $A_3B_3 + A_4B_4 + A_7B_7 + A_8B_8$ | RESULT 3 |
|---|---|---|
| 0 | 0 | SOURCE 5 |
| = | | |
| 0 | $A_1B_1 + A_2B_2 + A_5B_5 + A_6B_6$ | RESULT 4 |

FIG. 16D

UNPACK LOW RESULT 3, SOURCE 5

| $A_1B_1 + A_2B_2 + A_5B_5 + A_6B_6$ | $A_3B_3 + A_4B_4 + A_7B_7 + A_8B_8$ | RESULT 3 |
|---|---|---|
| 0 | 0 | SOURCE 5 |
| = | | |
| 0 | $A_3B_3 + A_4B_4 + A_7B_7 + A_8B_8$ | RESULT 5 |

FIG. 16E

PACKED ADD RESULT 4, RESULT 5

| 0 | $A_1B_1 + A_2B_2 + A_5B_5 + A_6B_6$ | RESULT 4 |
|---|---|---|
| 0 | $A_3B_3 + A_4B_4 + A_7B_7 + A_8B_8$ | RESULT 5 |
| = | | |
| 0 | TOTAL | RESULT 6 |

FIG. 16F

MULTIPLY-ADD SOURCE 1, SOURCE 2

| $A_1$ | $A_2$ | $C_1$ | $C_2$ | SOURCE 1 |
|---|---|---|---|---|
| $B_1$ | $B_2$ | $D_1$ | $D_2$ | SOURCE 2 |
| = | | | | |
| $A_1B_1 + A_2B_2$ | | $C_1D_1 + C_2D_2$ | | RESULT 1 |

FIG. 19

MULTIPLY-ADD SOURCE 1, SOURCE 2

| $A_1$ | $A_2$ | $C_1$ | $C_2$ | SOURCE 1 |
|---|---|---|---|---|
| $B_1$ | $B_2$ | $D_1$ | $D_2$ | SOURCE 2 |
| = | | | | |
| $A_1B_1 + A_2B_2$ | | $C_1D_1 + C_2D_2$ | | RESULT 1 |

FIG. 21A

MULTIPLY-ADD SOURCE 3, SOURCE 4

| $A_3$ | $A_4$ | $C_3$ | $C_4$ | SOURCE 3 |
|---|---|---|---|---|
| $B_3$ | $B_4$ | $D_3$ | $D_4$ | SOURCE 4 |
| = | | | | |
| $A_3B_3 + A_4B_4$ | | $C_3D_3 + C_4D_4$ | | RESULT 2 |

FIG. 21B

PACKED ADD RESULT 1, RESULT 2

| $A_1B_1 + A_2B_2$ | $C_1D_1 + C_2D_2$ | RESULT 1 |
|---|---|---|
| $A_3B_3 + A_4B_4$ | $C_3D_3 + C_4D_4$ | RESULT 2 |
| = | | |
| $A_1B_1 + A_2B_2 + A_3B_3 + A_4B_4$ | $C_1D_1 + C_2D_2 + C_3D_3 + C_4D_4$ | RESULT 6 |

FIG. 21C

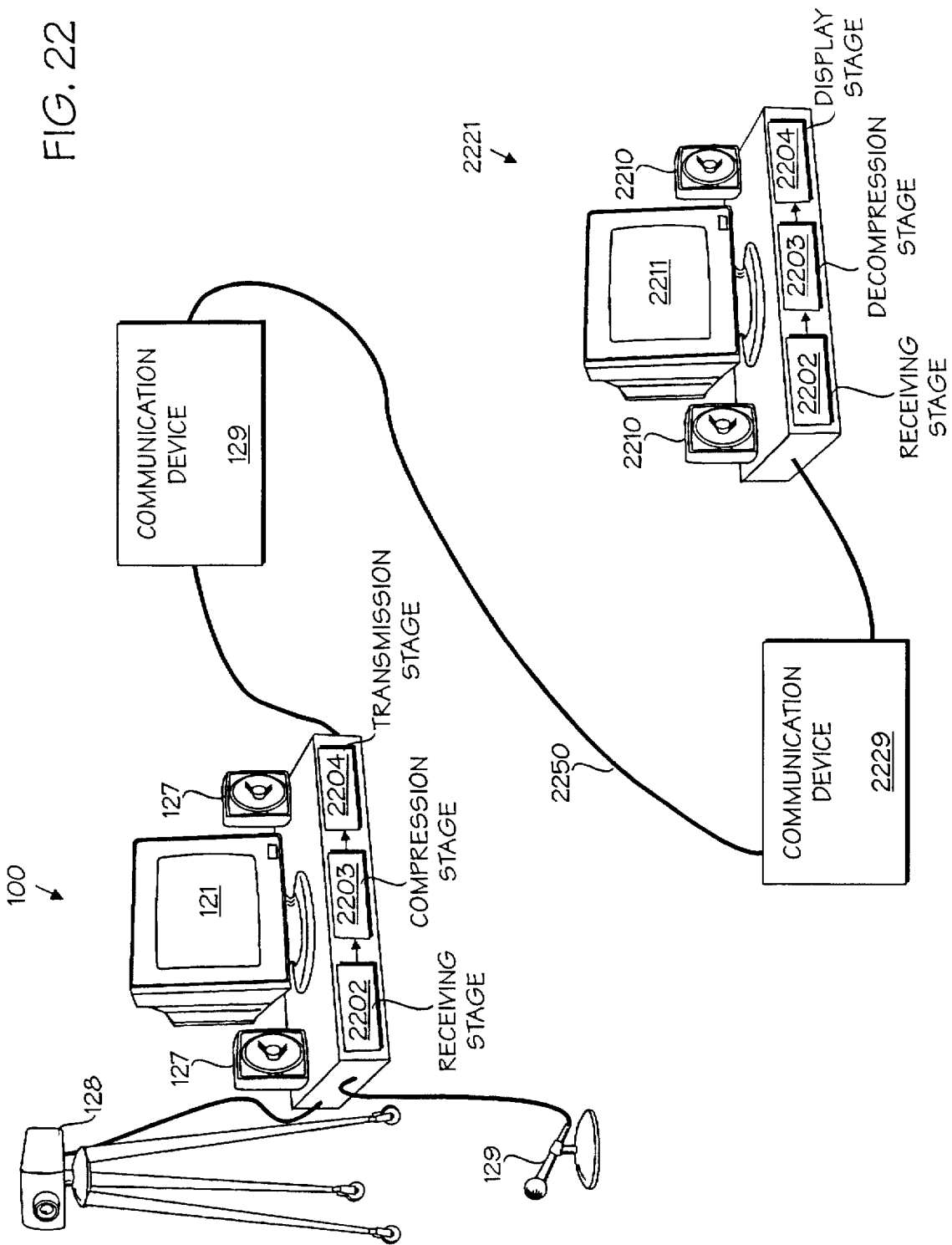

METHOD AND APPARATUS FOR PERFORMING MULTIPLY AND ACCUMULATE OPERATIONS ON PACKED DATA

BACKGROUND

1. Field of the Invention

The invention relates to the field of computer systems. More specifically, the invention relates to the area of systems which execute packed data operations.

2. Background Information

In typical computer systems, processors are implemented to operate on values represented by a large number of bits (e.g., 64) using instructions that produce one result. For example, the execution of an add instruction will add together a first 64-bit value and a second 64-bit value and store the result as a third 64-bit value. However, multimedia applications (e.g., applications targeted at computer supported cooperation (CSC—the integration of teleconferencing with mixed media data manipulation), 2D/3D graphics, image processing, video compression/decompression, recognition algorithms and audio manipulation) require the manipulation of large amounts of data which may be represented in a small number of bits. For example, graphical data typically requires 8 or 16 bits and sound data typically requires 8 or 16 bits. Each of these multimedia applications requires one or more algorithms, each requiring a number of operations. For example, an algorithm may require an add, compare and shift operation.

To improve efficiency of multimedia applications (as well as other applications that have the same characteristics), prior art processors provide packed data formats. A packed data format is one in which the bits typically used to represent a single value are broken into a number of fixed sized data elements, each of which represents a separate value. For example, a 64-bit register may be broken into two 32-bit elements, each of which represents a separate 32-bit value. In addition, these prior art processors provide instructions for separately manipulating each element in these packed data types in parallel. For example, a packed add instruction adds together corresponding data elements from a first packed data and a second packed data. Thus, if a multimedia algorithm requires a loop containing five operations that must be performed on a large number of data elements, it is desirable to pack the data and perform these operations in parallel using packed data instructions. In this manner, these processors can more efficiently process multimedia applications.

However, if the loop of operations contains an operation that cannot be performed by the processor on packed data (i.e., the processor lacks the appropriate instruction), the data will have to be unpacked to perform the operation. Therefore, it is desirable to incorporate in a computer system a set of packed data instructions that provide all the required operations for typical multimedia algorithms. However, due to the limited die area on today's general purpose microprocessors, the number of instructions which may be added is limited. Therefore, it is desirable to invent instructions that provide both versatility (i.e. instructions which may be used in a wide variety of multimedia algorithms) and the greatest performance advantage.

One prior art technique for providing operations for use in multimedia algorithms is to couple a separate digital signal processor (DSP) to an existing general purpose processor (e.g., The Intel® 486 manufactured by Intel Corporation of Santa Clara, Calif.). Another prior art solution uses dedicated video and/or audio processors. In either instance, the general purpose processor allocates jobs that can be performed (e.g., video processing) to the DSP or special purpose processor. Many DSP's, however, have lacked packed data format support.

One prior art DSP includes a multiply-accumulate instruction that adds to an accumulator the results of multiplying together two values. (see Kawakami, Yuichi, et al., "A Single-Chip Digital Signal Processor for Voiceband Applications", IEEE International Solid-State Circuits Conference, 1980, pp. 40–41). An example of the multiply-accumulate operation for this DSP is shown below in Table 1, where the instruction is performed on the data values $A_1$ and $B_1$ accessed as Source1 and Source2, respectively.

TABLE 1

| Multiply-Accumulate Source1, Source2 | |
|---|---|
| $A_1$ | Source1 |
| $B_1$ | Source2 |
| = | |
| $A_1 B_1$ + Accumulator | Result1 |

One limitation of this prior art instruction is its limited efficiency—i.e., it only operates on 2 values and an accumulator. For example, to multiply and accumulate two sets of 2 values requires the following 2 instructions performed serially: 1) multiply-accumulate the first value from the first set, the first value from the second set, and an accumulator of zero to generate an intermediate accumulator; 2) multiply-accumulate the second value from the first set, the second value from the second set, and the intermediate accumulator to generate the result.

Another prior art DSP includes a multiply-accumulate instruction that operates on two sets of two values and an accumulator. See, Digital Signal Processor with Parallel Multipliers, U.S. Pat. No. 4,771,470, Sep. 13, 1988 to Ando et al. (referred to herein as "Ando et al."). An example of the multiply-accumulate instruction for this DSP is shown below in Table 2, where the instruction is performed on the data values $A_1$, $A_2$, $B_1$ and $B_2$ accessed as Sources 1–4, respectively.

TABLE 2

| Source1 | | Source3 |
|---|---|---|
| $A_1$ | | $A_2$ |
| | Multiply Accumluate | |
| Source2 | | Source4 |
| $B_1$ | | $B_2$ |
| | = | Result1 |
| | $A_1 \cdot B_1 + A_2 \cdot B_2$ + Accumulator | |

Using this prior art technique, two sets of 2 values stored in four separate source(s) (e.g., RAM or ROM memory locations) are multiplied and then added to an accumulator in one instruction.

One shortcoming of this prior art DSP is that the multiplication and accumulation of two sets of values in this manner using this implementation is difficult to be performed in a processor which is backward compatible with and supports existing instruction sets. Because the performance of these operations requires the access of four source values stored in four source(s) (registers and/or memory locations), an instruction specifying this operation must be capable of specifying four separate source operands. The addition of such an instruction or set of instructions to an existing processor architecture, such as the Intel Architecture processor (IA™, as defined by Intel Corporation of Santa Clara, Calif.; see *Microprocessors*, Intel Data Books volume 1 and volume 2, 1992 and 1993, available from Intel of Santa Clara, Calif.), is difficult because of compatibility concerns with prior versions of the family of processors. It may prevent such a new processor supporting more than two operands from being backward compatible with the existing versions of software capable of being executed on prior versions of these processors.

This multiply-accumulate instruction also has limited versatility because it always adds to the accumulator. As a result, it is difficult to use the instruction for operations other than those that multiply-accumulate. For example, the multiplication of complex numbers is commonly used in multimedia applications. The multiplication of two complex number (e.g., $r_1\ i_1$ and $r_2\ i_2$) is performed according to the following equation:

Real Component=$r_1 \cdot r_2 - i_1 \cdot i_2$

Imaginary Component=$r_1 \cdot i_2 + r_2 \cdot i_1$

This prior art DSP cannot perform the function of multiplying together two complex numbers using one multiply-accumulate instruction.

This limitation of a multiply-accumulate instruction can be more clearly seen when the result of such a calculation is needed in a subsequent multiplication operation rather than an accumulation. For example, if the real component were calculated using this prior art DSP, the accumulator would need to be initialized to zero in order to correctly compute the result. Then the accumulator would again need to be initialized to zero in order to calculate the imaginary component. To perform another complex multiplication on the resulting complex number and a third complex number (e.g., r3, i3), the resulting complex number must be rescaled and stored into the acceptable memory format and the accumulator must again be initialized to zero. Then, the complex multiplication can be performed as described above. In each of these operations the ALU, which is devoted to the accumulator, is superfluous hardware and extra instructions are needed to re-initialize this accumulator. These extra instructions for re-initialization would otherwise have been unnecessary.

SUMMARY

A method of multiplying and accumulating two sets of values in a computer system. A packed multiply add is performed on a first portion of a first set of values packed into a first source and a first portion of a second set of values packed into a second source to generate a first result. The first result is unpacked into a plurality of values (e.g. two). The plurality of values is then added together to form a resulting accumulation value. No odd-sized (e.g. 24 bit) accumulator is required, the accumulator is a multiple of the packed data size and is itself, in some implementations, packed. In addition, for intermediate results, no clearing of the accumulator need take place.

Also, other methods of method of multiplying and accumulating two sets of values in a computer system are disclosed. In another implementation, a packed multiply add on a first portion of a first set of values packed into a first source and a first portion of a second set of values packed into a second source is performed to generate a first result. A packed multiply add on a second portion of the first set of values packed into a third source and a second portion of the second set of values packed into a fourth source is performed to generate a second result. The first result and the second result can then be added together to generate a resulting accumulation value.

Yet another method of multiplying and accumulating two sets of values is disclosed which performs packed multiply add operations on portions of source sets, wherein each of the source sets include a number of elements which is a multiple N of a number of values capable of being packed into single source and generating packed results therefrom. The method then performs packed add operations upon the results in order to form an intermediate result and the intermediate result is unpacked into a plurality of values. The plurality of values is then added together (in packed or unpacked form) to form an accumulation value.

In one embodiment, the packed adds are performed upon pairs of first results and first intermediate results until a single intermediate result remains. Subsequently thereto, if N is an odd number, an odd packed result is packed added to the single intermediate result to form the intermediate result. In this type operation, N packed multiply-add operations and N−1 packed add operations are performed.

Yet another method of multiplying and accumulating in a computer system is disclosed. This method includes performing a packed multiply add on a first set of values packed into a first source and a second set of values packed into a second source to generate a packed intermediate result. The packed intermediate result is added to an accumulator to generate a packed accumulated result in the accumulator. These steps may be iterated with of the first set of values and portions of the second set of values to the accumulator to generate the packed accumulated result. Subsequently thereto, the packed accumulated result in the accumulator is unpacked into a first result and a second result and the first result and the second result are added together to generate an accumulated result.

In one embodiment, the method may include performing a dot-product of the first set of values and the second set of values. In other embodiments, this may include part of an autocorrelation or digital filter (e.g. a finite impulse response [FIR] filter). In the latter case, the first set of values and the second set of values comprise complex values which each include a real and an imaginary portion.

Yet another method of multiplying and accumulating in a computer system is disclosed. This method includes performing a packed multiply add on a first set of values packed into a first source and a second set of values packed into a second source to generate an intermediate result. The intermediate result is then added to an accumulator to generate an accumulated result in the accumulator. This method may also be iteratively performed with portions of the first set of values and second set of values to generate the packed accumulated result in the accumulator.

BRIEF DESCRIPTION OF THE DRAWINGS

The invention is illustrated by way of example, and not limitation, in the figures. Like references indicate similar elements.

FIGS. 9, 10a–10c, and 11 illustrate a first embodiment of a method for multiplying and accumulating two sets of four data elements.

FIGS. 12, 13a–13d and 14 illustrate a second embodiment of a method for multiplying and accumulating two sets of four data elements.

FIGS. 15, 16a–16f, 17 and 18 illustrate methods of multiplying and accumulating two sets of four elements or greater, especially those that have eight members in each set or greater, wherein each set is a multiple of four.

FIGS. 19, 20 and 21a–21c illustrate methods of multiplying and accumulating more than two sets of elements.

FIG. 22 illustrates system configuration(s) and a method which includes circuitry using the multiply-accumulate operations described herein.

DETAILED DESCRIPTION

Figure 1:
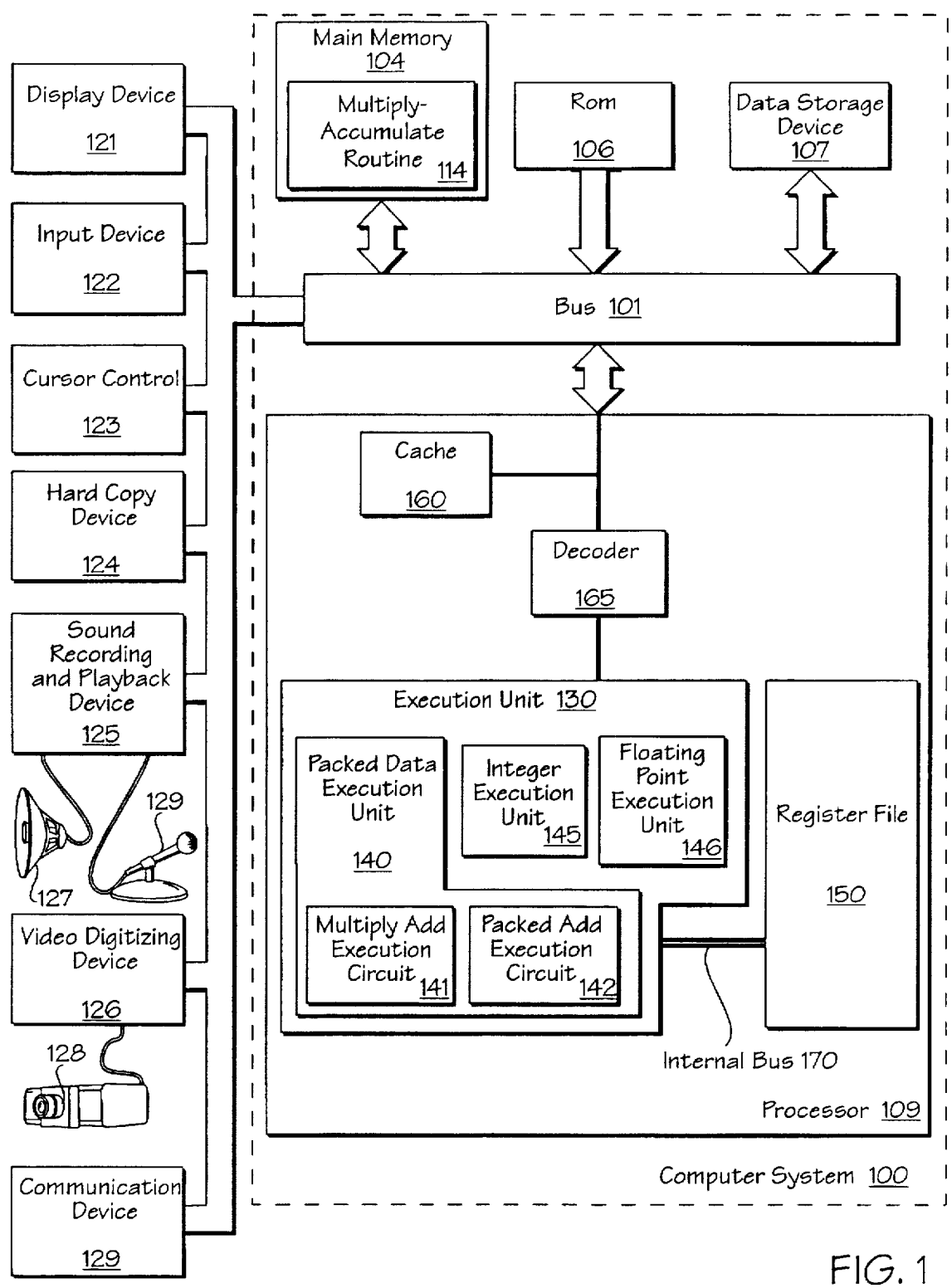
FIG. 1 illustrates an exemplary computer system according to one embodiment of the invention.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Definitions

To provide a foundation for understanding the description of the embodiments of the invention, the following definitions are provided.

Bit X through Bit Y:
  defines a subfield of binary number. For example, bit six through bit zero of the byte $00111010_2$ (shown in base two) represent the subfield $111010_2$. This is also known as a "little endian" convention. The '$_2$' following a binary number indicates base 2. Therefore, $1000_2$ equals $8_{10}$, while $F_{16}$ equals $15_{10}$.

Rx: is a register. A register is any device capable of storing and providing data. Further functionality of a register is described below. A register is not necessarily, included on the same die or in the same package as the processor.

SRC1, SRC2, and DEST:
  identify storage areas (e.g., memory addresses, registers, etc.)

Source1-i and Result1-i:
  represent data.

Overview

This application describes a method and apparatus for including in a processor instructions for performing multiply-add operations on packed data. In one embodiment, two multiply-add operations are performed using a single multiply-add instruction as shown below in Table 3a and Table 3b. Table 3a shows a simplified representation of the disclosed multiply-add instruction, while Table 3b shows a bit level example of the disclosed multiply-add instruction.

TABLE 3a

Multiply-Add Source1, Source2

| $A_1$ | $A_2$ | $A_3$ | $A_4$ | Source1 |
|---|---|---|---|---|
| $B_1$ | $B_2$ | $B_3$ | $B_4$ | Source2 |
| = | | | | |
| $A_1B_1 + A_2B_2$ | | $A_3B_3 + A_4B_4$ | | Result1 |

TABLE 3b

| 11111111 11111111 | 11111111 00000000 | 01110001 11000111 | 01110001 11000111 |
|---|---|---|---|
| 3 | 2 | 1 | 0 |
| Multiply | Multiply | Multiply | Multiply |
| 00000000 00000000 | 00000000 00000001 | 10000000 00000000 | 00000100 00000000 |
| ↓ | ↓ | ↓ | ↓ |
| 32-Bit Intermediate Result 4 | 32-Bit Intermediate Result 3 | 32-Bit Intermediate Result 2 | 32-Bit Intermediate Result 1 |
| _____Add_____ | | _____Add_____ | |
| 11111111 11111111 | 11111111 00000000 | 11001000 11100011 | 10011100 00000000 |
| 1 | | 0 | |

Thus, the described embodiment of the multiple-add instruction multiplies together four corresponding 16-bit data elements of Source1 and Source2 generating two 32-bit intermediate results. These 32-bit intermediate results are summed by pairs producing two 32-bit results that are packed into their respective elements of a packed result. Similar formats are used for source operands and results (powers of 2) with no loss in precision and without the use of an odd size accumulator (e.g., a 24-bit accumulator for 16-bit sources).

As will be further described below, alternative embodiments may vary the number of bits in the data elements, intermediate results, and results. In addition, alternative embodiment may vary the number of data elements used, the number of intermediate results generated, and the number of data elements in the resulting packed data. A multiply-subtract operation may be the same as the multiply-add operation, except the adds are replaced with subtracts. The operation of an example multiply-subtract instruction is shown below in Table 4.

TABLE 4

Multiply-Subtract Source1, Source2

| $A_1$ | $A_2$ | $A_3$ | $A_4$ | Source1 |
|---|---|---|---|---|
| $B_1$ | $B_2$ | $B_3$ | $B_4$ | Source2 |
| = | | | | |
| $A_1B_1 - A_2B_2$ | | $A_3B_3 - A_4B_4$ | | Result1 |

Of course, alternative embodiments may implement variations of these instructions. For example, alternative embodiments may include an instruction which performs at least one multiply-add operation or at least one multiply-subtract operation. As another example, alternative embodiments may include an instruction which performs at least one multiply-add operation in combination with at least one multiply-subtract operation. As another example, alternative embodiments may include an instruction which perform multiply-add operation(s) and/or multiply-subtract operation(s) in combination with some other operation.

Computer System

FIG. 1 illustrates an exemplary computer system 100 according to one embodiment of the invention. Computer system 100 includes a bus 101, or other communications hardware and software, for communicating information, and a processor 109 coupled with bus 101 for processing information. Processor 109 represents a central processing unit of any type of architecture, including a CISC or RISC type architecture. Computer system 100 further includes a random access memory (RAM) or other dynamic storage device (referred to as main memory 104), coupled to bus 101 for storing information and instructions to be executed by processor 109. For example, it may be used to store a multiply/accumulate routine 114 which is accessed by processor 109 during system runtime to perform multiply/accumulate operations on data, such as signals digitized by video digitizing device 126 received from camera 128. It may also be used for processing input audio signals received by microphone 129 into recording device 125, or output signals to speaker 127 via playback device 125. This routine may further be used for processing signals transmitted and/or received by a communication device 129 (e.g., a modem).

Main memory 104 also may be used for storing temporary variables or other intermediate information during execution of instructions by processor 109. Computer system 100 also includes a read only memory (ROM) 106, and/or other static storage device, coupled to bus 101 for storing static information and instructions for processor 109. Data storage device 107 is coupled to bus 101 for storing information and instructions.

FIG. 1 also illustrates that processor 109 includes an execution unit 130, a register file 150, a cache 160, a decoder 165, and an internal bus 170. Of course, processor 109 contains additional circuitry which is not necessary to understanding the invention.

Execution unit 130 is used for executing instructions received by processor 109. In addition to recognizing instructions typically implemented in general purpose processors, execution unit 130 recognizes packed instructions for performing operations on packed data formats. The packed instruction set includes instructions for supporting multiply-add operations. In addition, the packed instruction set may also include instructions for supporting a pack operation, an unpack operation, a packed add operation, a packed multiply operation, a packed shift operation, a packed compare operation, a population count operation, and a set of packed logical operations (including packed AND, packed ANDNOT, packed OR, and packed XOR) as described in "A Set of Instructions for Operating on Packed Data," filed on Aug. 31, 1995, Ser. No. 08/521,360.

Execution unit 130 is coupled to register file 150 by internal bus 170. Register file 150 represents a storage area on processor 109 for storing information, including data. It is understood that one aspect of the invention is the described instruction set for operating on packed data. According to this aspect of the invention, the storage area used for storing the packed data is not critical. However, one embodiment of the register file 150 is later described with reference to FIG. 2. Execution unit 130 is coupled to cache 160 and decoder 165. Cache 160 is used to cache data and/or control signals from, for example, main memory 104. Decoder 165 is used for decoding instructions received by processor 109 into control signals and/or microcode entry points. In response to these control signals and/or microcode entry points, execution unit 130 performs the appropriate operations. For example, if an add instruction is received, decoder 165 causes execution unit 130 to perform the required addition; if a subtract instruction is received, decoder 165 causes execution unit 130 to perform the required subtraction; etc. Decoder 165 may be implemented using any number of different mechanisms (e.g., a look-up table, a hardware implementation, a PLA, etc.). Thus, while the execution of the various instructions by the decoder and execution unit is represented by a series of if/then statements, it is understood that the execution of an instruction does not require a serial processing of these if/then statements. Rather, any mechanism for logically performing this if/then processing is considered to be within the scope of the invention.

Execution unit 130 includes a plurality of execution units in one embodiment of the present invention. For example, the execution unit 130 may include an integer execution unit 145 for executing integer instructions. In addition, execution unit 130 may include a floating point execution unit 146 for the execution of floating point instruction. Execution unit 130 of processor 109 further includes a packed data execution unit 140 which executes packed data instructions. The packed data execution unit 140 includes a plurality of execution circuits for executing packed data instructions which include, but are not limited to, multiply-add execution circuit 141 and the packed-add execution circuit 142. Other packed data instruction execution units may be present as the implementation requires.

FIG. 1 additionally shows a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone 129 for recording information or a speaker and accompanying amplifier 127 for playing back audio information.

Also, computer system 100 can be a terminal in a computer network (e.g., a LAN). Computer system 100 would then be a computer subsystem of a computer network. System 100 may include a communication device 129 for communicating with other computers, such as a modem or network adapter. Computer system 100 optionally includes video digitizing device 126. Video digitizing device 126 can be used to capture video images provided by a video camera 128 that can be stored or transmitted to other computer systems.

In one embodiment, the processor 109 additionally supports an instruction set which is compatible with the Intel architecture instruction set used by existing processors (e.g., the Pentium® processor) manufactured by Intel Corporation of Santa Clara, Calif. Thus, in one embodiment, processor 109 supports all the operations supported in the Intel Architecture (IA™) processor. As a result, processor 109 can support existing Intel Architecture operations in addition to the operations provided by implementations of the invention. While the invention is described as being incorporated into an Intel Architecture based instruction set, alternative embodiments could incorporate the invention into other instruction sets. For example, the invention could be incorporated into a 64-bit processor using a new instruction set.

Figure 2:
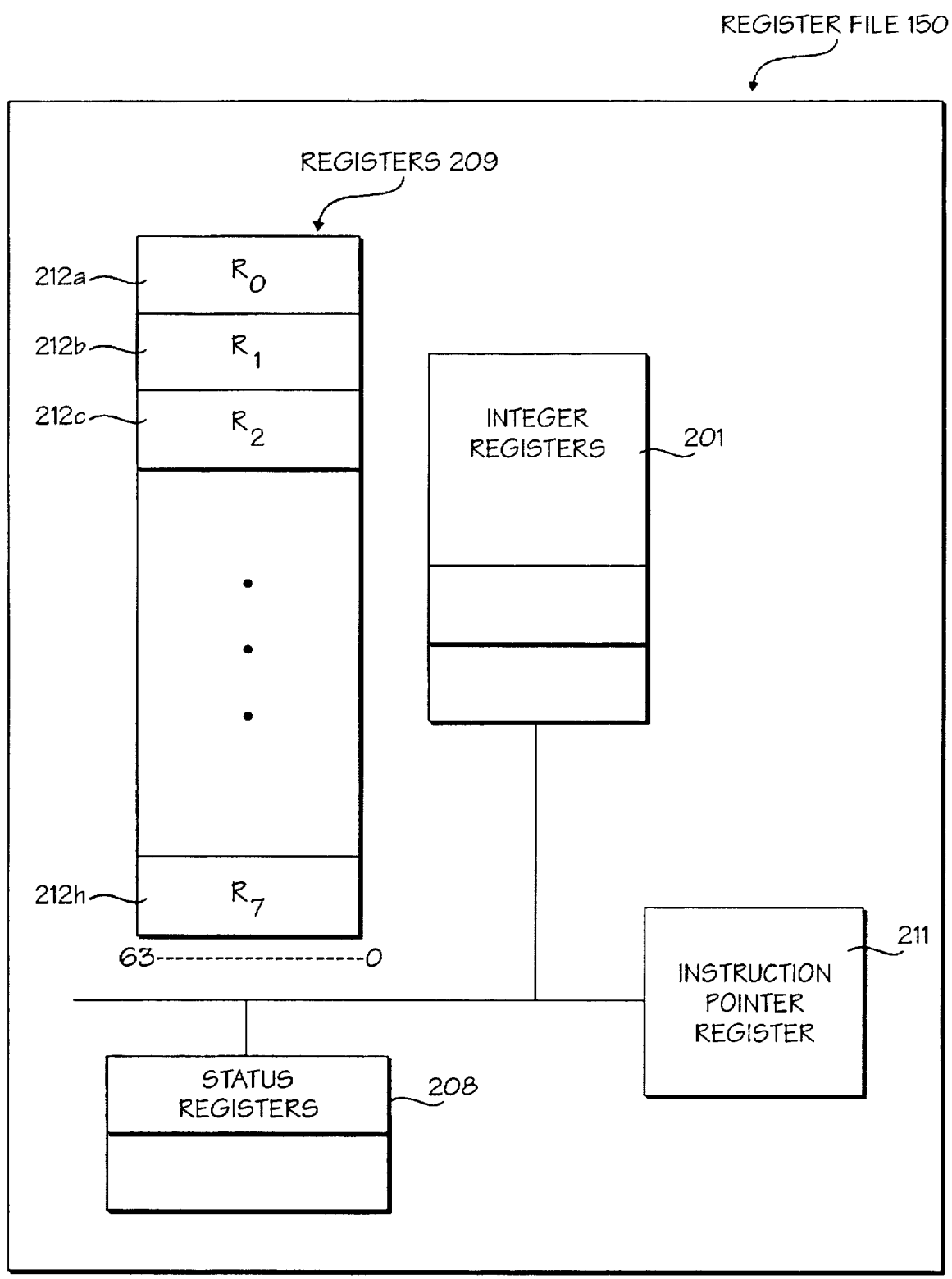
FIG. 2 illustrates a register file of the processor according to one embodiment of the invention.

FIG. 2 illustrates the register file of the processor according to one embodiment of the invention. The register file 150 is used for storing information, including control/status information, integer data, floating point data, and packed data. In the embodiment shown in FIG. 2, the register file 150 includes integer registers 201, registers 209, status registers 208, and instruction pointer register 211. Status registers 208 indicate the status of processor 109. Instruction pointer register 211 stores the address of the next instruction to be executed. Integer registers 201, registers 209, status registers 208, and instruction pointer register 211 are all coupled to internal bus 170. Any additional registers would also be coupled to internal bus 170.

In one embodiment, the registers 209 are used for both packed data and floating point data. In this embodiment, the processor 109, at any given time, must treat the registers 209 as being either stack referenced floating point registers or non-stack referenced packed data registers. A mechanism is included to allow the processor 109 to switch between operating on registers 209 as stack referenced floating point registers and non-stack referenced packed data registers. In another embodiment, the processor 109 may simultaneously operate on registers 209 as non-stack referenced floating point and packed data registers. As another example in another embodiment, these same registers may be used for storing integer data.

Of course, alternative embodiments may be implemented to contain more or less sets of registers. For example, an alternative embodiment may include a separate set of floating point registers for storing floating point data. As another example, an alternative embodiment may including a first set of registers, each for storing control/status information, and a second set of registers, each capable of storing integer, floating point, and packed data. As a matter of clarity, the registers of an embodiment should not be limited in meaning to a particular type of circuit. Rather, a register of an embodiment need only be capable of storing and providing data, and performing the functions described herein.

The various sets of registers (e.g., the integer registers 201, the registers 209) may be implemented to include different numbers of registers and/or to different size registers. For example, in one embodiment, the integer registers 201 are implemented to store thirty-two bits, while the registers 209 are implemented to store eighty bits (all eighty bits are used for storing floating point data, while only sixty-four are used for packed data). In addition, registers 209 contains eight registers, $R_0$ 212a through $R_7$ 212h, $R_1$ 212a, $R_2$ 212b and $R_3$ 212c are examples of individual registers in registers 209. Thirty-two bits of a register in registers 209 can be moved into an integer register in integer registers 201. Similarly, a value in an integer register can be moved into thirty-two bits of a register in registers 209. In another embodiment, the integer registers 201 each contain 64 bits, and 64 bits of data may be moved between the integer register 201 and the registers 209.

Figure 3:
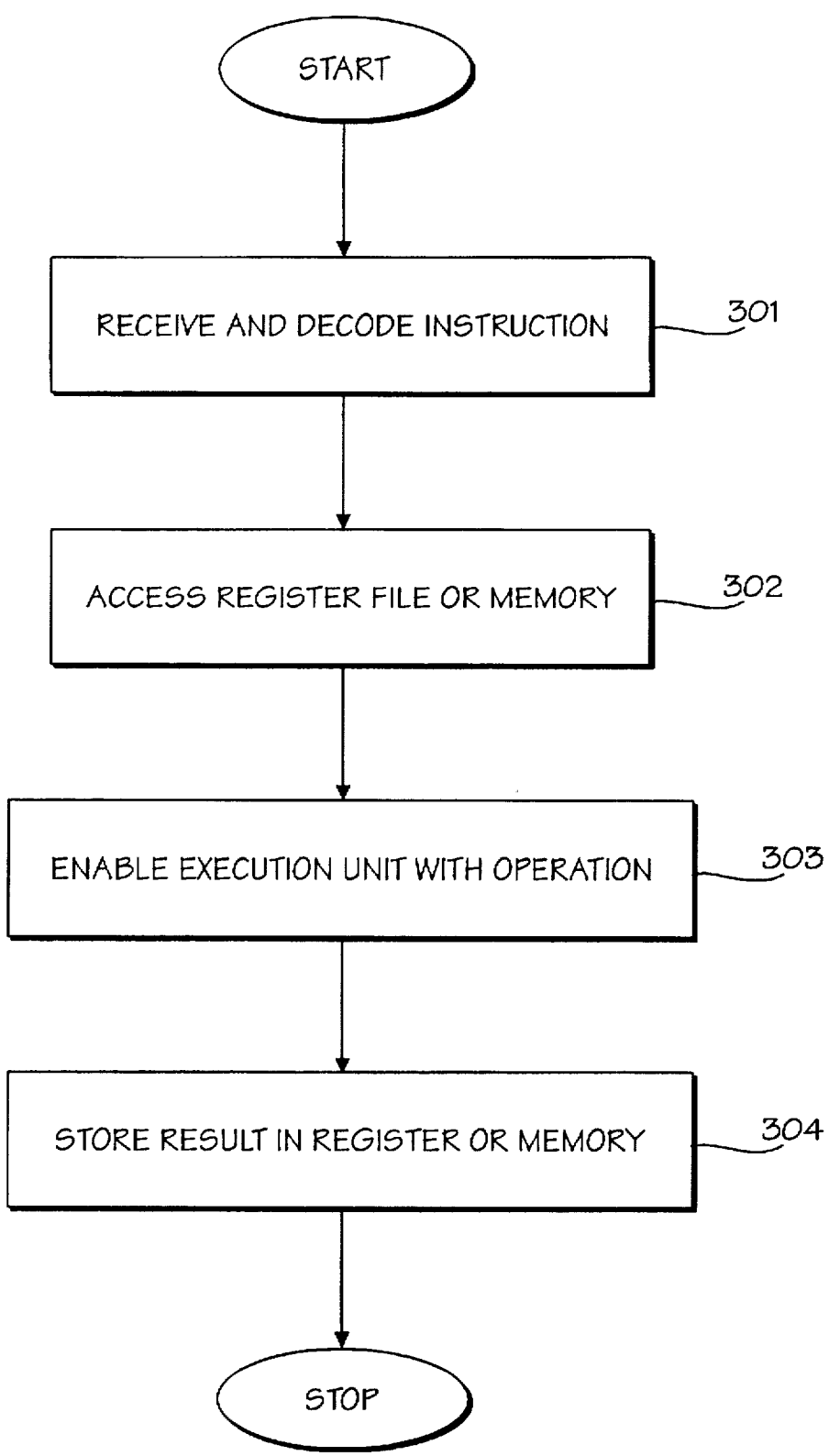
FIG. 3 is a flow diagram illustrating the general steps used by the processor to manipulate according to one embodiment of the invention.

FIG. 3 is a flow diagram illustrating the general steps are used by the processor to manipulate data according to one embodiment of the invention. That is, FIG. 3 illustrates the steps followed by processor 109 while performing an operation on packed data, performing an operation on unpacked data, or performing some other operation. For example, such operations include a load operation to load a register in register file 150 with data from cache 160, main memory 104, or read only memory (ROM) 106.

At step 301, the decoder 165 receives a control signal from either the cache 160 or bus 101. Decoder 165 decodes the control signal to determine the operations to be performed.

At step 302, Decoder 165 accesses the register file 150, or a location in memory. Registers in the register file 150, or memory locations in the memory, are accessed depending on the register address specified in the control signal. For example, for an operation on packed data, the control signal can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. In one embodiment, SRC1 or SRC2 is also used as DEST. SRC1, SRC2 and DEST are described more fully in relation to FIG. 6a and FIG. 6b. The data stored in the corresponding registers is referred to as Source1, Source2, and Result respectively. Each of these data is sixty-four bits in length.

In another embodiment of the invention, any one, or all, of SRC1, SRC2 and DEST, can define a memory location in the addressable memory space of processor 109. For example, SRC1 may identify a memory location in main memory 104, while SRC2 identifies a first register in integer registers 201 and DEST identifies a second register in registers 209. For simplicity of the description herein, the invention will be described in relation to accessing the register file 150. However, these accesses could be made to memory instead.

At step 303, execution unit 130 is enabled to perform the operation on the accessed data. At step 304, the result is stored back into register file 150 according to requirements of the control signal.

Data and Storage Formats

Figure 4:
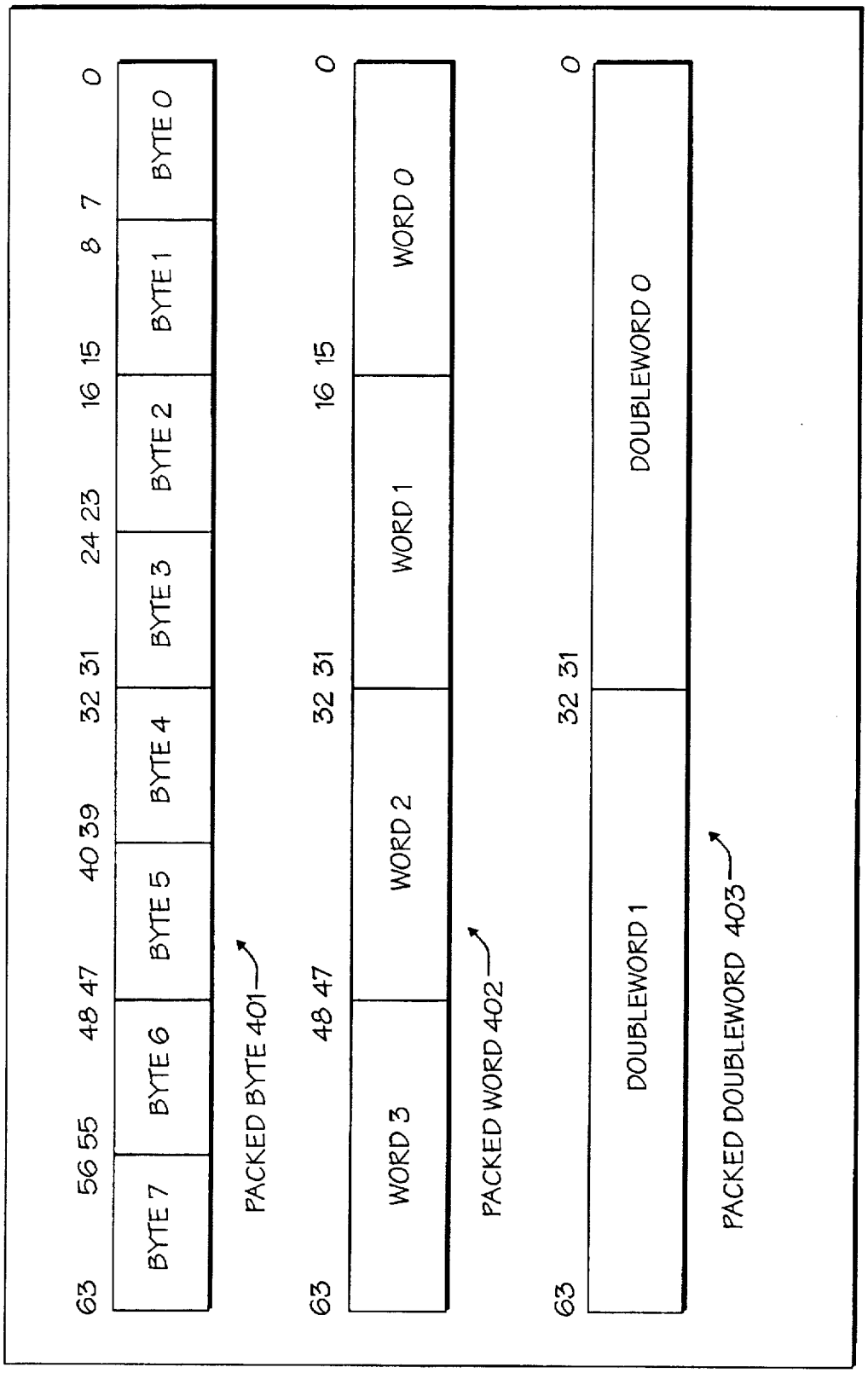
FIG. 4 illustrates packed data-types according to one embodiment of the invention.

FIG. 4 illustrates packed data-types according to one embodiment of the invention. Three packed data formats are illustrated; packed byte 401, packed word 402, and packed doubleword 403. Packed byte, in one embodiment of the invention, is sixty-four bits long containing eight data elements. Each data element is one byte long. A data element is an individual piece of data that is stored in a single register (or memory location) with other data elements of the same length. In one embodiment of the invention, the number of data elements stored in a register is sixty-four bits divided by the length in bits of a data element. Of course, this is extendible to any width which is addressable as a single source operand. The number of data elements capable of being packed is the total source operand size divided by the width of each data element.

In this embodiment, packed word 402 is sixty-four bits long and contains four word 402 data elements. Each word 402 data element contains sixteen bits of information.

Packed doubleword 403 is sixty-four bits long and contains two doubleword 403 data elements. Each doubleword 403 data element contains thirty-two bits of information.

Figure 5A:
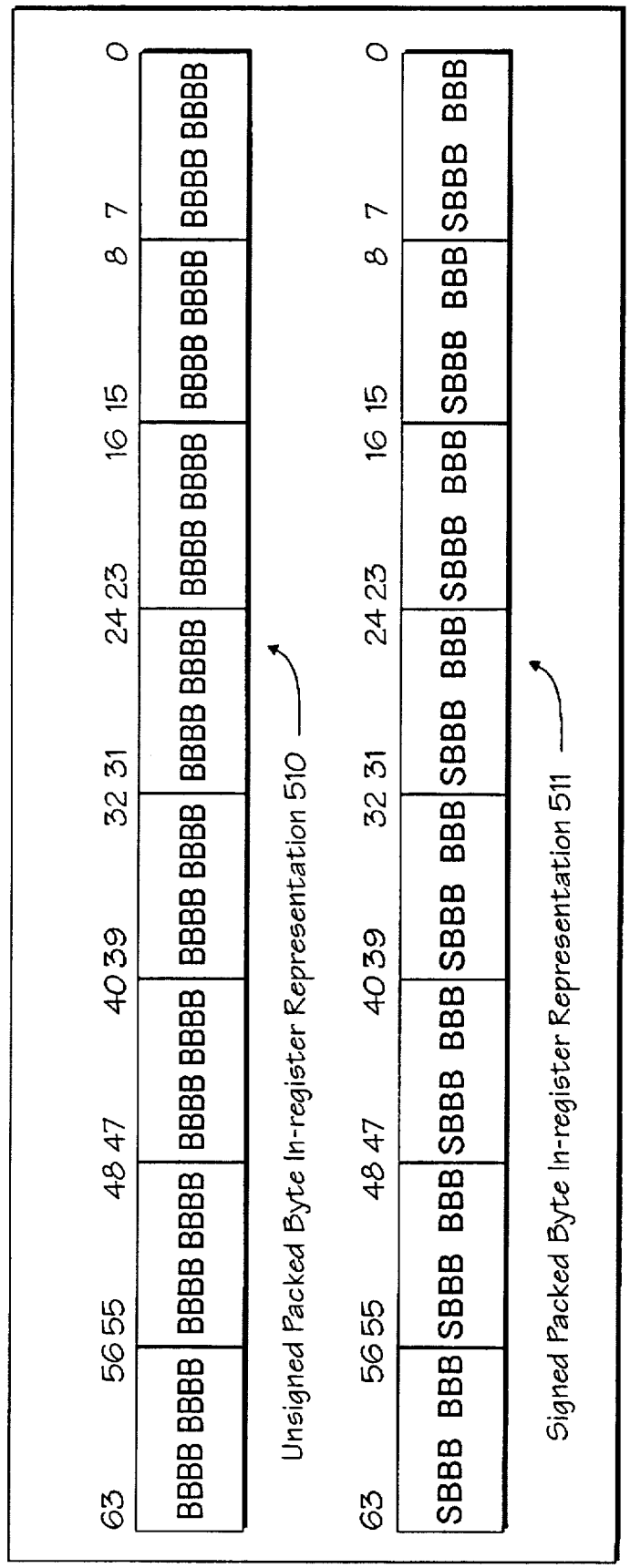
FIG. 5a illustrates in-register packed data representations according to one embodiment of invention.
Figure 5B:
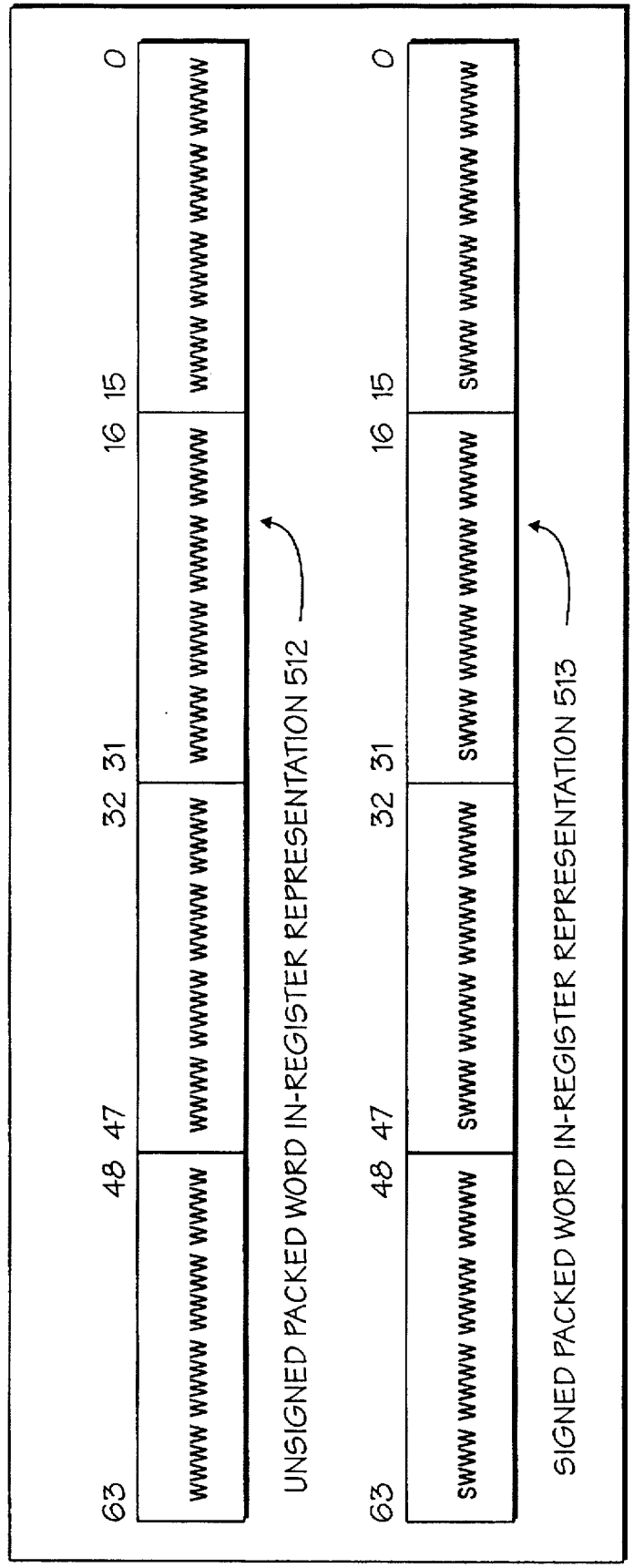
FIG. 5b illustrates in-register packed data representations according to one embodiment of invention.
Figure 5C:
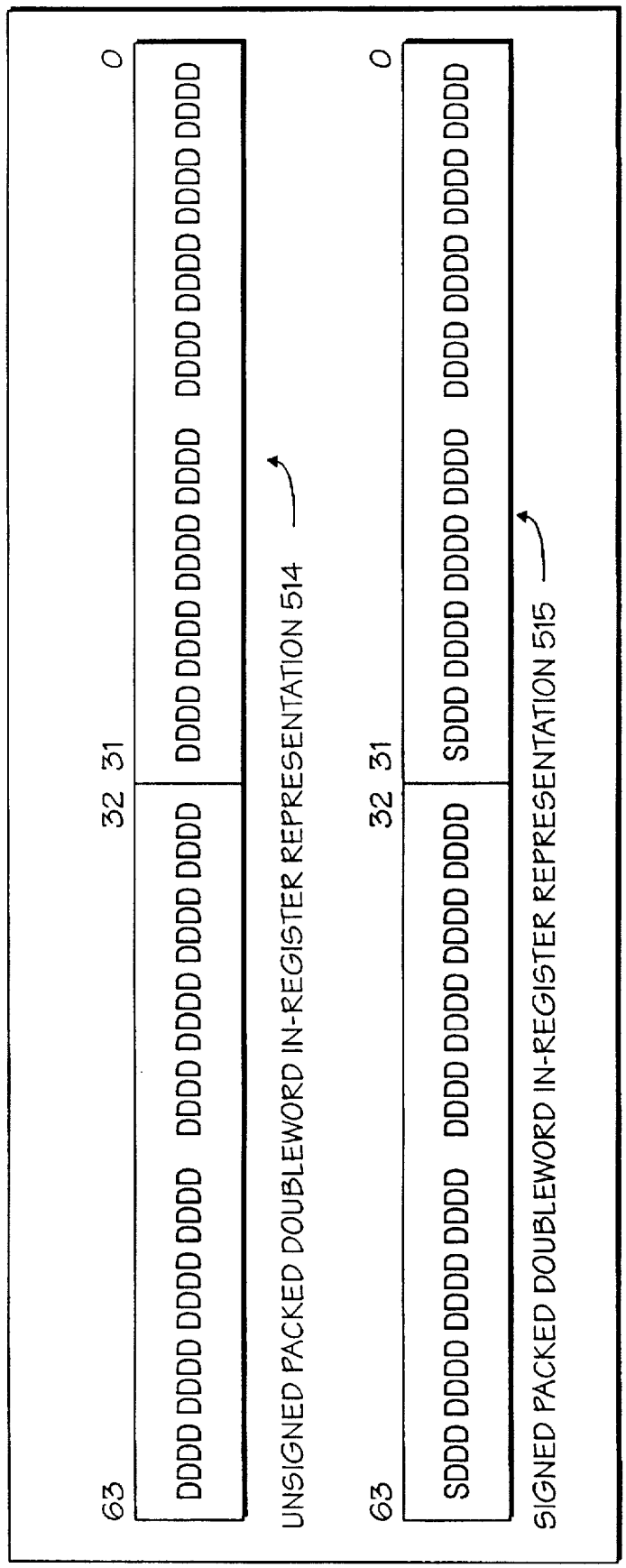
FIG. 5c illustrates in-register packed data representations according to one embodiment of invention.

FIG. 5a through 5c illustrate the in-register packed data storage representation according to one embodiment of the invention. Unsigned packed byte in-register representation 510 illustrates the storage of an unsigned packed byte 401 in one of the registers $R_0$ 212a through $R_7$ 212h. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 511 illustrates the storage of a signed packed byte 401. Note that the eighth bit of every byte data element is the sign indicator.

Unsigned packed word in-register representation 512 illustrates how word three through word zero are stored in one register of registers 209. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that the sixteenth bit of each word data element is the sign indicator.

Unsigned packed doubleword in-register representation 514 shows how registers 209 store two doubleword data elements. Doubleword zero is stored in bit thirty-one through bit zero of the register. Doubleword one is stored in bit sixty-three through bit thirty-two of the register. Signed packed doubleword in-register representation 515 is similar to unsigned packed doubleword in-register representation 514. Note that the necessary sign bit is the thirty-second bit of the doubleword data element.

As mentioned previously, registers 209 may be used for both packed data and floating point data. In this embodiment of the invention, the individual programming processor 109 may be required to track whether an addressed register, $R_0$ 212a for example, is storing packed data or floating point data. In an alternative embodiment, processor 109 could track the type of data stored in individual registers of registers 209. This alternative embodiment could then generate errors if, for example, a packed addition operation were attempted on floating point data.

Control Signal Formats

The following describes one embodiment of the control signal formats used by processor 109 to manipulate packed data. In one embodiment of the invention, control signals are represented as thirty-two bits. Decoder 165 may receive the control signal from bus 101. In another embodiment, decoder 165 can also receive such control signals from cache 160.

Figure 6A:
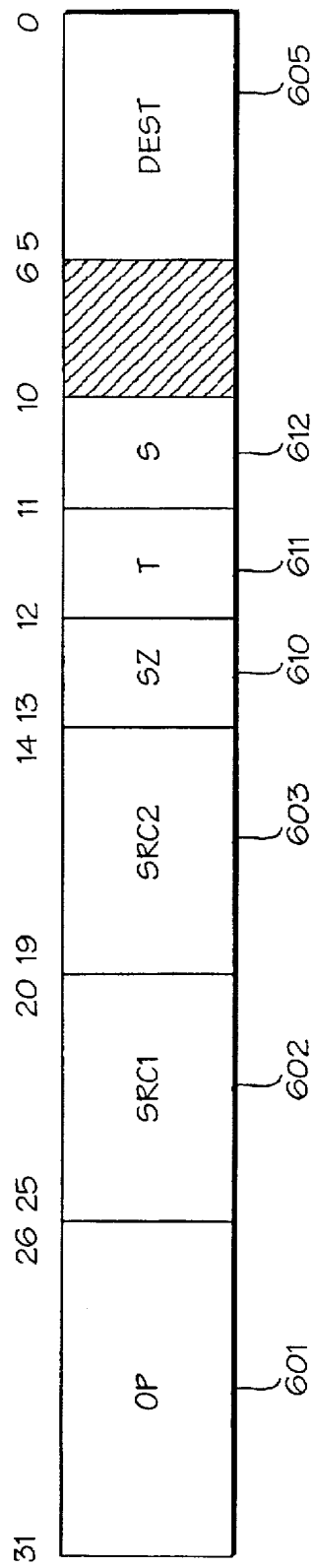
FIG. 6a illustrates a control signal format for indicating the use of packed data according to one embodiment of the invention.

FIG. 6a illustrates a control signal format for indicating the use of packed data according to one embodiment of the invention. Operation field OP 601, bit thirty-one through bit twenty-six, provides information about the operation to be performed by processor 109; for example, packed addition, packed subtraction, etc. SRC1 602, bit twenty-five through twenty, provides the source register address of a register in registers 209. This source register contains the first packed data, Source1, to be used in the execution of the control signal. Similarly, SRC2 603, bit nineteen through bit fourteen, contains the address of a register in registers 209. This second source register contains the packed data, Source2, to be used during execution of the operation. DEST 605, bit five through bit zero, contains the address of a register in registers 209. This destination register will store the result packed data, Result, of the packed data operation.

Control bits SZ 610, bit twelve and bit thirteen, indicates the length of the data elements in the first and second packed data source registers. If SZ 610 equals $01_2$, then the packed data is formatted as packed byte 401. If SZ 610 equals $10_2$, then the packed data is formatted as packed word 402. SZ 610 equaling $00_2$ or $11_2$ is reserved, however, in another embodiment, one of these values could be used to indicate packed doubleword 403.

Control bit T 611, bit eleven, indicates whether the operation is to be carried out with saturate mode. If T 611 equals one, then a saturating operation is performed. If T 611 equals zero, then a non-saturating operation is performed. Saturating operations will be described later.

Control bit S 612, bit ten, indicates the use of a signed operation. If S 612 equals one, then a signed operation is performed. If S 612 equals zero, then an unsigned operation is performed.

Figure 6B:
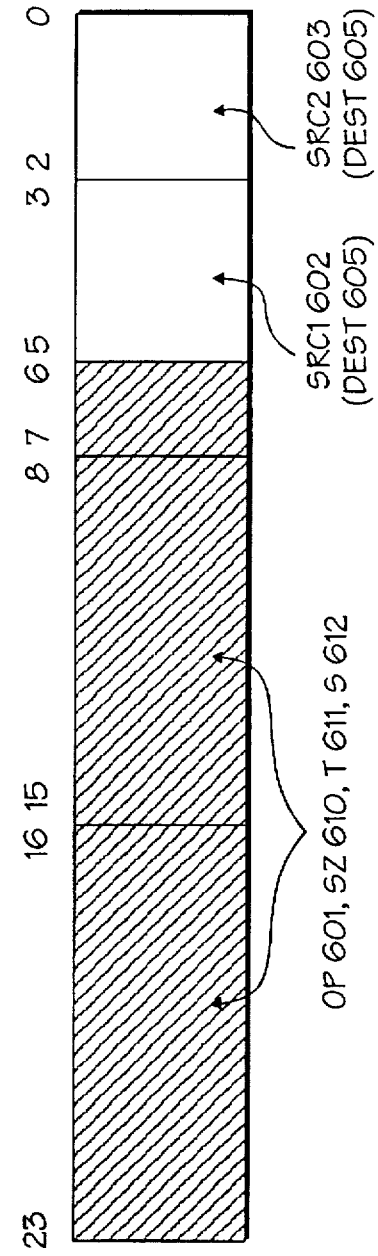
FIG. 6b illustrates a second control signal format for indicating the use of packed data according to one embodiment of the invention.

FIG. 6b illustrates a second control signal format for indicating the use of packed data according to one embodiment of the invention. This format corresponds with the general integer opcode format described in the "Pentium Processor Family User's Manual," available from Intel Corporation, Literature Sales, P.O. Box 7641, Mt. Prospect, Ill., 60056-7641. Note that OP 601, SZ 610, T 611, and S 612 are all combined into one large field. For some control signals, bits three through five are SRC1 602. In one embodiment, where there is a SRC1 602 address, then bits three through five also correspond to DEST 605. In an alternate embodiment, where there is a SRC2 603 address, then bits zero through two also correspond to DEST 605. For other control signals, like a packed shift immediate operation, bits three through five represent an extension to the opcode field. In one embodiment, this extension allows a programmer to include an immediate value with the control signal, such as a shift count value. In one embodiment, the immediate value follows the control signal. This is described in more detail in the "Pentium Processor Family User's Manual," in appendix F, pages F-1 through F-3. Bits zero through two represent SRC2 603. This general format allows register to register, memory to register, register by memory, register by register, register by immediate, register to memory addressing. Also, in one embodiment, this general format can support integer register to register, and register to integer register addressing.

Description of Saturate/Unsaturate

As mentioned previously, T 611 indicates whether operations optionally saturate. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 5.

TABLE 5

| Data Format | Minimum Value | Maximum Value |
|---|---|---|
| Unsigned Byte | 0 | 255 |
| Signed Byte | −128 | 127 |
| Unsigned Word | 0 | 65535 |
| Signed Word | −32768 | 32767 |
| Unsigned Doubleword | 0 | $2^{64}-1$ |
| Signed Doubleword | $-2^{63}$ | $2^{63}-1$ |

As mentioned above, T 611 indicates whether saturating operations are being performed. Therefore, using the unsigned byte data format, if an operation's result=258 and saturation was enabled, then the result would be clamped to 255 before being stored into the operation's destination register. Similarly, if an operation's result=−32999 and processor 109 used signed word data format with saturation enabled, then the result would be clamped to −32768 before being stored into the operation's destination register.

Multiply-Add Operation(s)

In one embodiment of the invention, the SRC1 register contains packed data (Source1), the SRC2 register contains packed data (Source2), and the DEST register will contain the result (Result) of performing the multiply-add instruction on Source1 and Source2. In the first step of the execution of the multiply-add instruction, Source1 will have each data element independently multiplied by the respective data element of Source2 to generate a set of respective intermediate results. These intermediate results are summed by pairs to generate the Result for the multiply-add instruction. In contrast, these intermediate results are subtracted by pairs to generate the Result for the multiply-subtract instruction.

In one embodiment of the invention, the multiply-add instructions operate on signed packed data and truncate the results to avoid any overflows. In addition, these instructions operate on packed word data and the Result is a packed double word. However, alternative embodiments could support these instructions for other packed data types.

Using the mechanism which will now be described, implemented embodiments of the present invention which implement the multiply-add operation accept as an input a packed word such as 402 shown in FIG. 4 and generate as an output a packed doubleword such as 403 shown in FIG. 4. That is, there are four input source operands, and two output result operands. Because the input and output data are packed, only two sources need to be specified in the invoking instruction. Thus, in contrast to prior art operations which require specification of four input operands and a single output operand (typically, the accumulator as in prior art multiply-accumulate operations), implemented embodiments of the present invention only require the specification of two source operands. This is due to the packing of multiple sources in single operands as shown in the formats of FIG. 4. Note that other packed operands may also be used, according to implementation.

Figure 7:
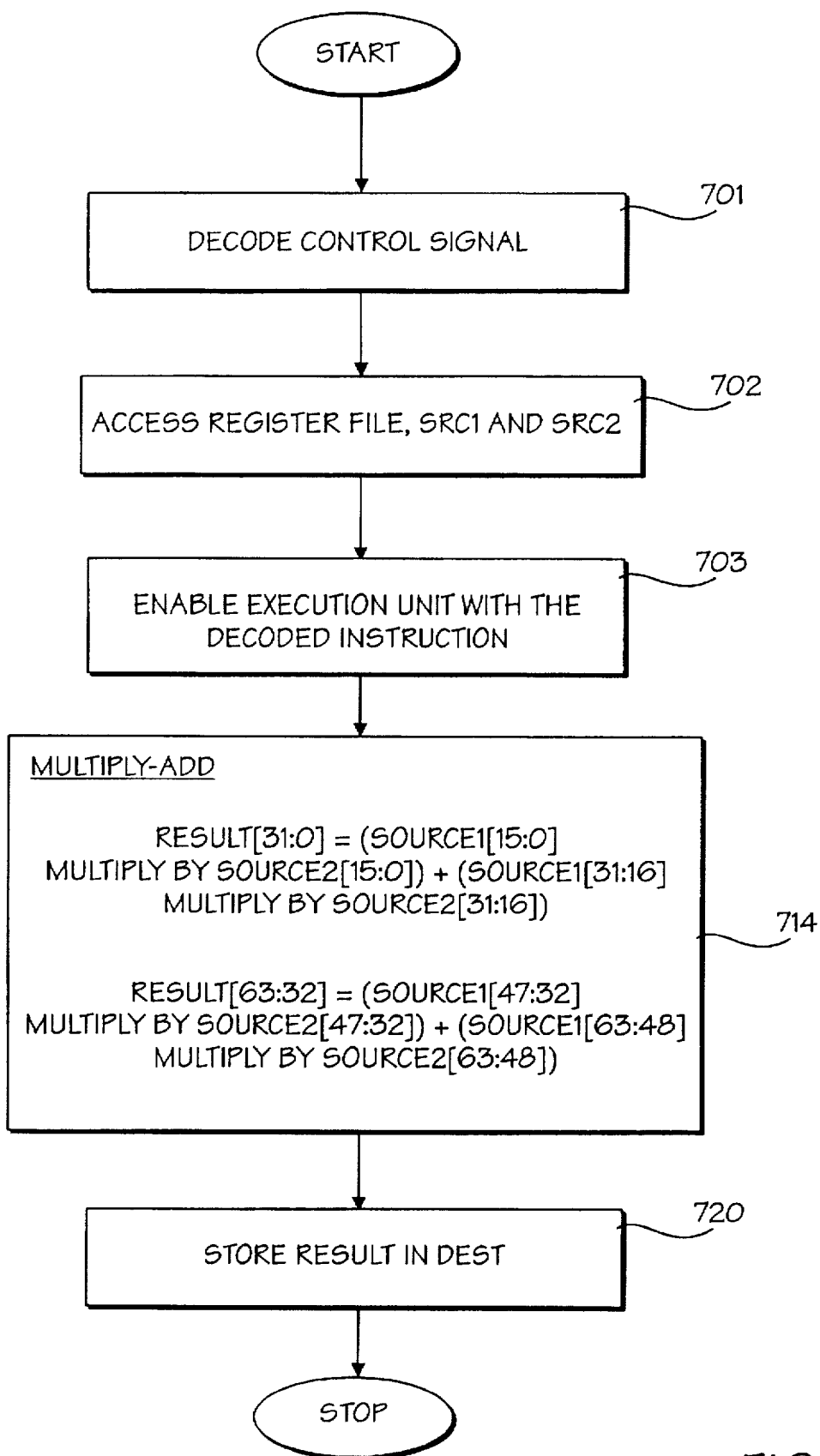
FIG. 7 is a flow diagram illustrating a method for performing multiply-add operations on packed data according to one embodiment of the invention.

FIG. 7 is a flow diagram illustrating a method for performing multiply-add operations on packed data according to one embodiment of the invention.

At step 701, decoder 165 decodes the control signal received by processor 109. Thus, decoder 165 decodes the operation code for a multiply-add instruction.

At step 702, via internal bus 170, decoder 165 accesses registers 209 in register file 150 given the SRC1 602 and SRC2 603 addresses. Registers 209 provide execution unit 130 with the packed data stored in the SRC1 602 register (Source1), and the packed data stored in SRC2 603 register (Source2). That is, registers 209 communicate the packed data to execution unit 130 via internal bus 170.

At step 703, decoder 165 enables execution unit 130 to perform the instruction. If the instruction is a multiply-add instruction, flow passes to step 714.

In step 714, the following is performed. Source1 bits fifteen through zero are multiplied by Source2 bits fifteen through zero generating a first 32-bit intermediate result (intermediate result 1). Source1 bits thirty-one through sixteen are multiplied by Source2 bits thirty-one through sixteen generating a second 32-bit intermediate result (intermediate result 2). Source1 bits forty-seven through thirty-two are multiplied by Source2 bits forty-seven through thirty-two generating a third 32-bit intermediate result (intermediate result 3). Source1 bits sixty-three through forty-eight are multiplied by Source2 bits sixty-three through forty-eight generating a fourth 32-bit intermediate result (intermediate result 4). Intermediate result 1 is added to intermediate result 2 generating Result bits thirty-one through 0, and intermediate result 3 is added to intermediate result 4 generating Result bits sixty-three through thirty-two.

Different embodiments may perform the multiplies and adds serially, in parallel, or in some combination of serial and parallel operations.

At step 720, the Result is stored in the DEST register.

Packed Data Multiply-Add Circuits

In one embodiment, the multiply-add instructions can execute on multiple data elements in the same number of clock cycles as a single multiply on unpacked data. To achieve execution in the same number of clock cycles, parallelism is used. That is, registers are simultaneously instructed to perform the multiply-add operations on the data elements. This is discussed in more detail below.

Figure 8:
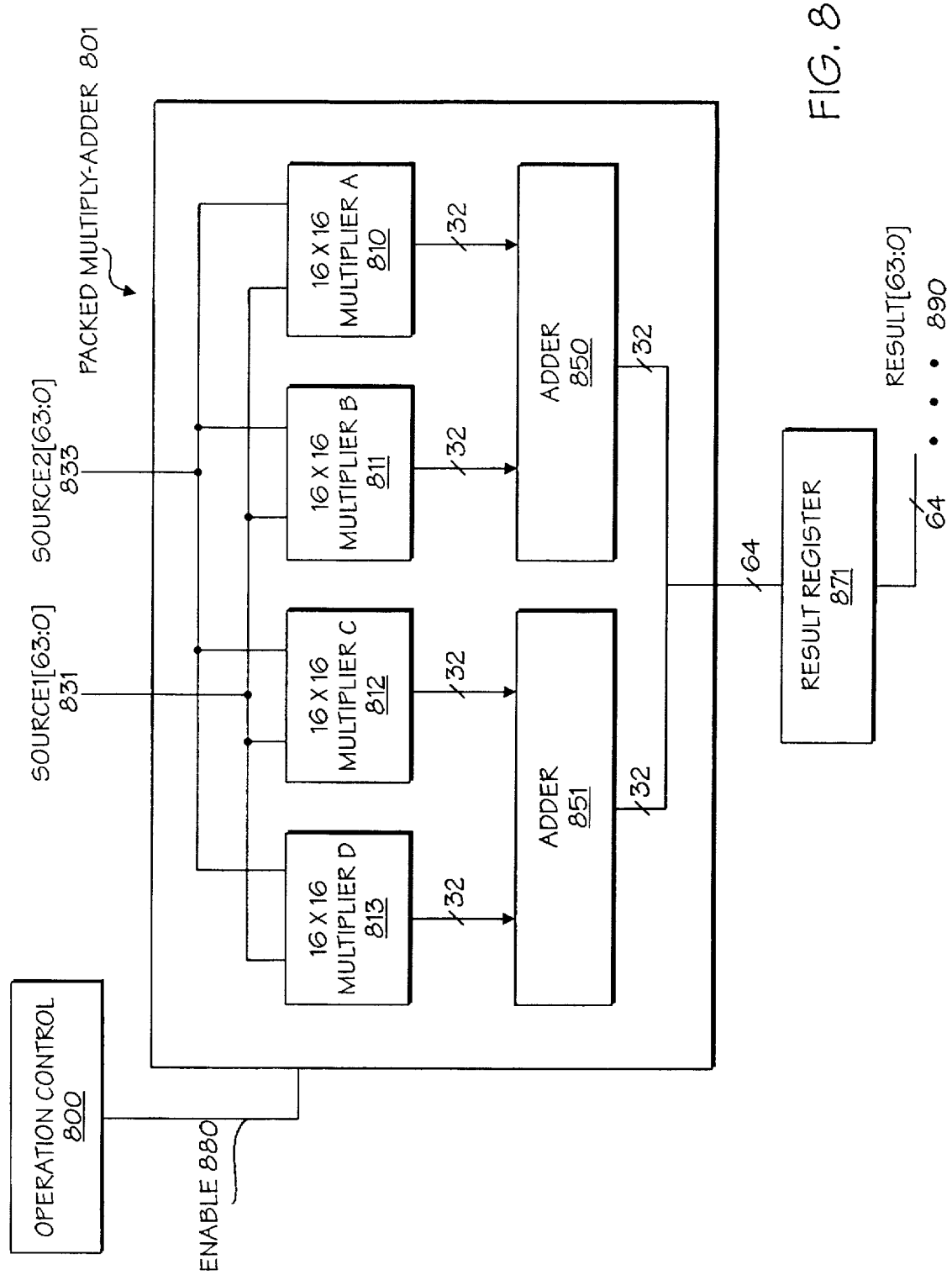
FIG. 8 illustrates a circuit for performing multiply-add operations on packed data according to one embodiment of the invention.

FIG. 8 illustrates a circuit for performing multiply-add operations on packed data according to one embodiment of the invention. Operation control 800 processes the control signal for the multiply-add instructions. Operation control 800 outputs signals on Enable 880 to control Packed multiply-adder.

Packed multiply-adder 801 has the following inputs: Source1|63:0| 831, Source2|63:0| 833, and Enable 880. Packed multiply-adder 801 includes four 16×16 multiplier circuits: 16×16 multiplier A 810, 16×16 multiplier B 811, 16×16 multiplier C 812 and 16×16 multiplier D 813. 16×16 multiplier A 810 has as inputs Source1|15:0| and Source2 [15:0]. 16×16 multiplier B 811 has as inputs Source1|31:16| and Source2|31:16|. 16×16 multiplier C 812 has as inputs Source1|47:32| and Source2|47:32|. 16×16 multiplier D 813 has as inputs Source1[63:48] and Source2[63:48]. The 32-bit intermediate results generated by 16×16 multiplier A 810 and 16×16 multiplier B 811 are received by adder 1350, while the 32-bit intermediate results generated by 16×16 multiplier DC 812 and 16×16 multiplier D 813 are received by adder 851.

Based on whether the current instruction is a multiply/add instruction, adder 850 and adder 851 add their respective 32-bit inputs. The output of adder 850 (i.e., Result bits 31 through zero of the Result) and the output of adder 851 (i.e., bits 63 through 32 of the Result) are combined into the 64-bit Result and communicated to Result Register 871.

In one embodiment, each of adder 851 and adder 850 are composed of four 8-bit adders with the appropriate propagation delays. However, alternative embodiments could implement adder 851 and adder 850 in any number of ways (e.g., two 32-bit adders).

To perform the equivalent of multiply-add instructions in prior art processors which operate on unpacked data, four separate 16-bit multiply operations and two 32-bit add operations, as well as the necessary load and store operations, would be needed. This wastes data lines and circuitry that are used for the bits that are higher than bit sixteen for Source1 and Source2, and higher than bit thirty two for the Result. As well, the entire 64-bit result generated by the prior art processor may not be of use to the programmer. Therefore, the programmer would have to truncate each result.

Performing the equivalent of this multiply-add instruction using the prior art DSP processor described with reference to Table 1 requires one instruction to zero the accumulator and four multiply-accumulate instructions. Performing the equivalent of this multiply-add instruction using the prior art DSP processor described with reference to Table 2 requires one instruction to zero the accumulator and 2-accumulate instructions.

Advantages of Including the Described Multiply-Add Instruction in the Instruction Set As previously described, the prior art multiply-accumulate instructions always add the results of their multiplications to an accumulator. This accumulator becomes a bottleneck for performing operations other than multiplying and accumulating (e.g., the accumulator must be cleared each time a new set of operations is required which do not require the previous accumulator). This accumulator also becomes a bottleneck if operations, such as rounding, need to be performed before accumulation.

In contrast, the disclosed multiply-add instruction does not carry forward an accumulator. As a result, these instructions are easier to use in a wider variety of algorithms. In addition, software pipelining can be used to achieve comparable throughput. To illustrate the versatility of the multiply-add instruction, several example multimedia algorithms are described below. Some of these multimedia algorithms use additional packed data instructions. The operation of these additional packed data instructions are shown in relation to the described algorithms. For a further description of these packed data instructions, see "A Set of Instructions for Operating on Packed Data", filed on Aug. 31, 1995, Ser. No. 08/521,803. Of course, other packed data instructions could be used. In addition, a number of steps requiring the use of general purpose processor instructions to manage data movement, looping, and conditional branching have been omitted in the following examples.

MULTIPLY AND ACCUMULATE OPERATIONS

The disclosed multiply-add instruction can also be used to multiply and accumulate values. Using the various described embodiments, substantial performance increase may be realized over prior art methods of multiplying and accumulating values because the multiply-add instruction does not add to a previous accumulator, but rather, creates a new result which is generated from the multiplying and adding of preexisting values. The absence of data dependencies also allows concurrent processing to further improve performance over prior art multiply/accumulate operations.

In addition, certain of the methods described herein require the use of a packed-add instruction. The packed-add instruction may be any form of prior packed-add instruction, including those in the prior art, such as that disclosed in U.S. Pat. No. 5,327,369 issued Jul. 5, 1994, to Ashkenazi which is assigned to Intel Corporation of Santa Clara, Calif., the assignee of the present invention. Certain of the methods also require unpacked operations which can be performed in any number of prior art manners, such as add operations which operate upon unpacked data. Note that any of these operations may also be performed using novel addition or unpacking techniques.

Because the multiply-add functions described herein operate upon packed data, typically, those involving source registers or memory locations which include four packed data elements, other formats of packed data may be used having less than or more than four, according to implementation. Particular performance advantages are realized, however, when the sets which are to be multiplied and accumulated have a number of elements which are some multiple of the numbers of elements which can be packed into source memory locations or registers and operated upon by the multiply-add execution units. These various methods for multiplying and accumulating values will now be discussed with reference to FIGS. 9–21c.

Multiplying and Accumulating Two Sets of Four Elements

Figure 9:
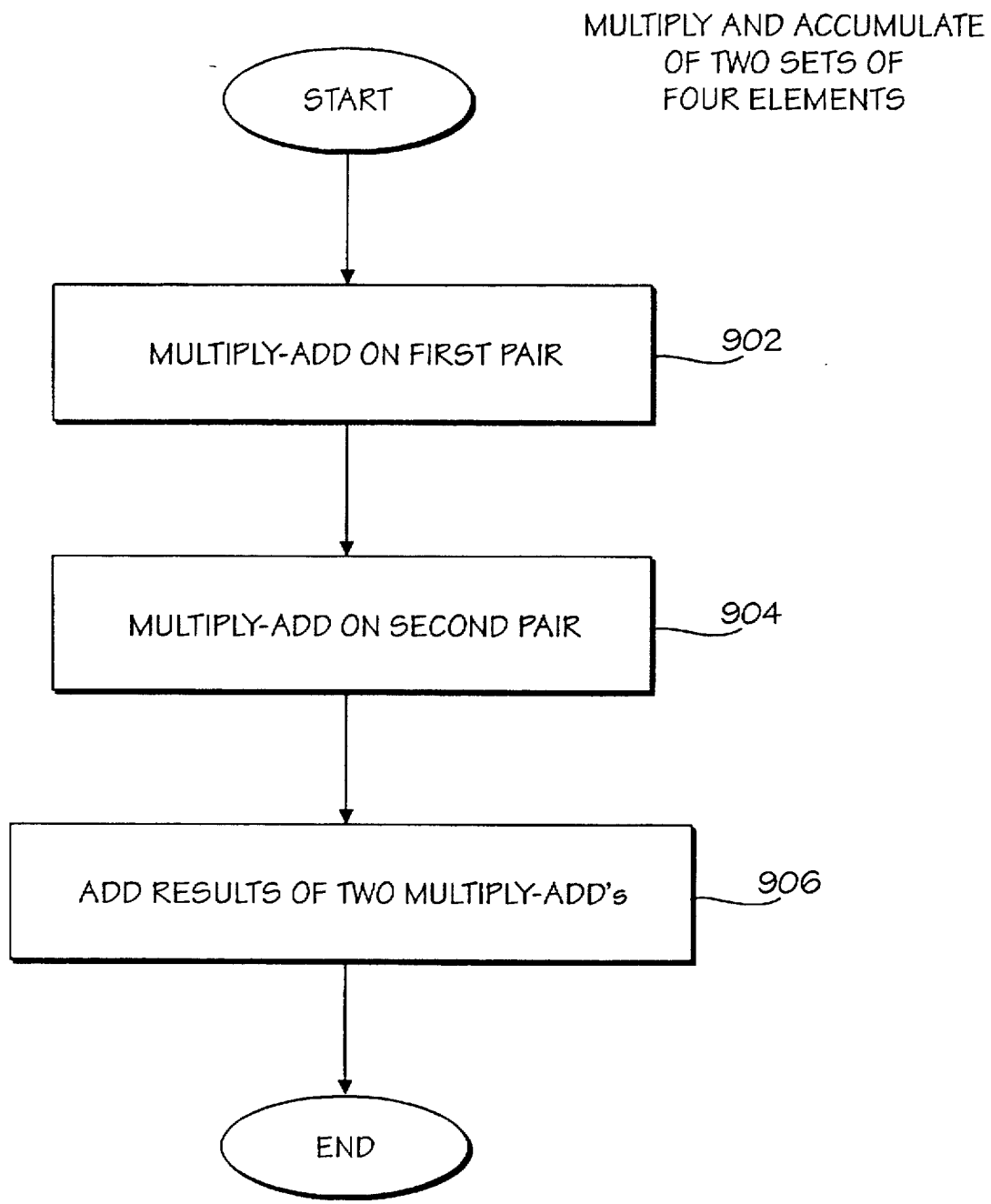
Figure 11:
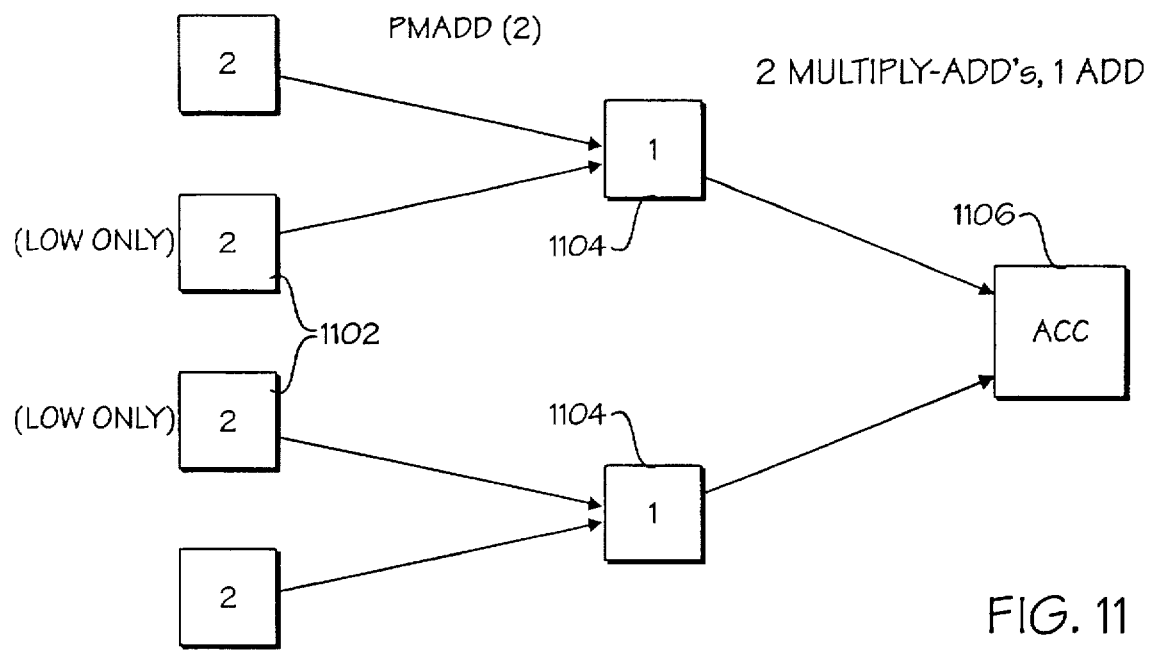

For a first embodiment, the method shown in FIGS. 9–11 is performed. FIG. 9 illustrates the method performed upon two source elements which each have packed therein two elements of each of the two sets which are being multiplied and accumulated. FIGS. 10a–10c illustrate the results of each operation, and FIG. 11 shows the data flow caused by each set of operations and the data dependencies among the operations. As shown in FIG. 10a, the first two elements, $A_1$ and $A_2$ of a first set A and a first two elements $B_1$ and $B_2$ of a second set B are stored in two memory locations or registers Source1 and Source2. At step 902 shown in FIG. 9 and FIG. 10a, the two source elements are multiplied and added in order to form an intermediate result 1. At step 904, and as shown in FIG. 10b, the remaining two elements $A_3$, $A_4$, $B_3$ and $B_4$ in the sets A and B are stored in a third and fourth source registers Source3 and Source4. The two elements are then multiply-added together at step 904 to form the second intermediate result 2. Subsequently thereto, as illustrated in FIG. 10c, the two intermediate results 1 and 2 are added together using an unpacked-add operation at step 906 to form the final accumulated result, result 3 as illustrated in FIG. 10c. Note that in one embodiment, each of the instructions shown is implemented to complete each clock cycle.

FIG. 11 shows the data processed and operations which may be performed at each stage of the process of multiplying and accumulating these two sets of four elements. Note that these operations can be performed in parallel if a computer system and/or processor can perform such operations, either in parallel or in concurrent fashion because the data at each stage of the operations have no data dependencies. Each of the boxes in the figure indicates a single source, and the number shown inside the rectangle is the number of elements stored in each source. For example, at stage 1102, two packed multiply-add operations can be performed upon the data which have been stored in the low portion of the packed data sources only. Note that these may also be packed in the low portion of the packed data source only, according to implementation. At a second stage of operation, the results 1104 of the multiply-add operation are then added together using an unpacked-add operation. This then forms the final accumulated result 1106, which is available for any subsequent processing.

Figure 12:
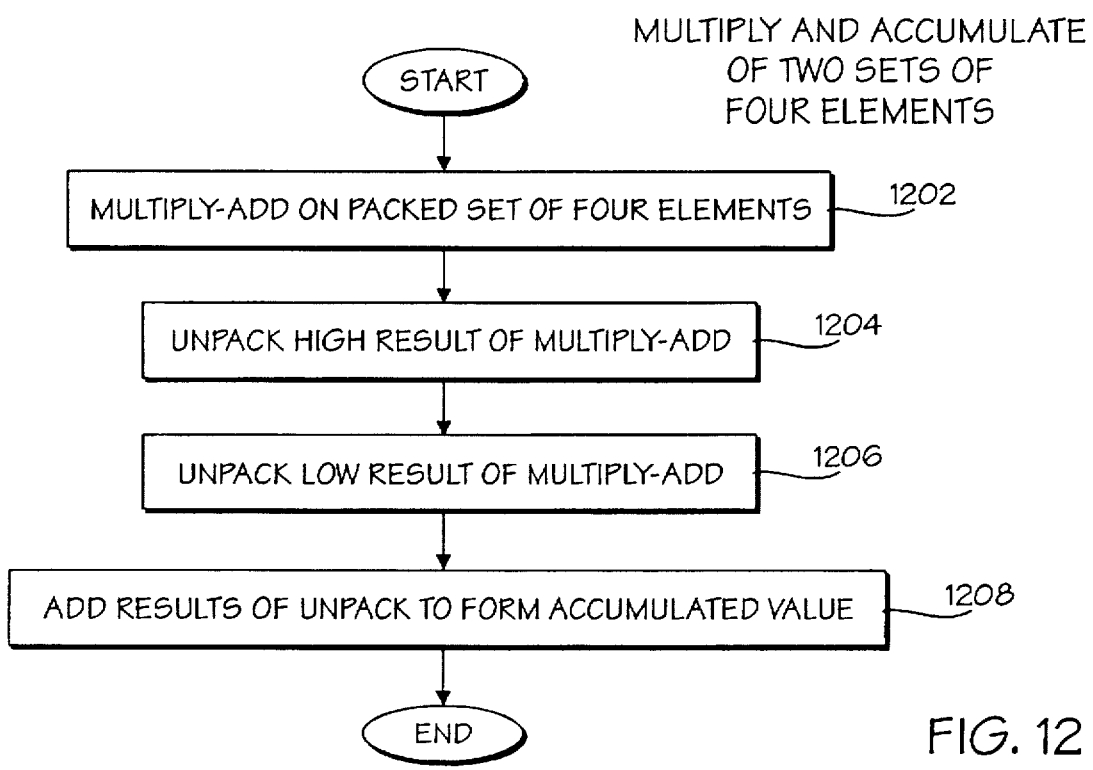
Figures 13D, 14:
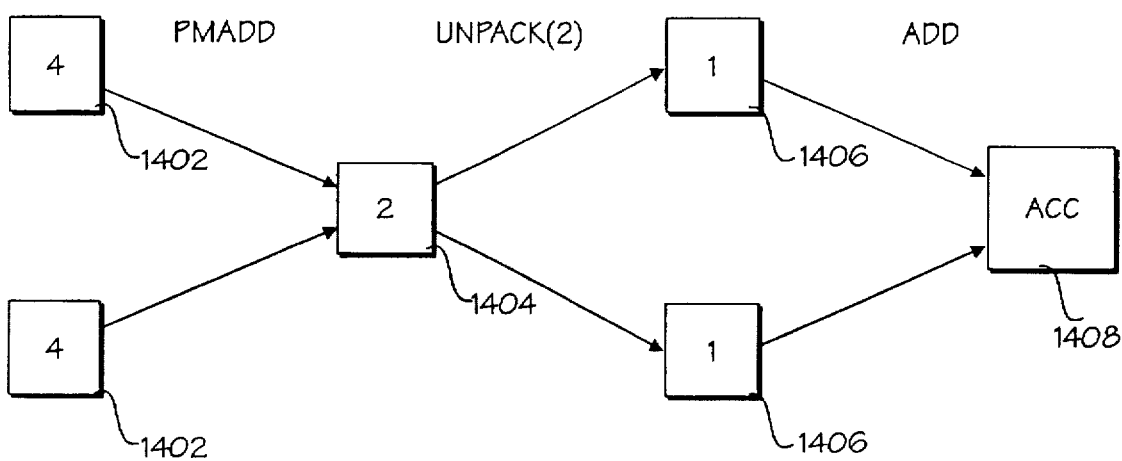

A second embodiment of the multiplying and accumulating of two sets of four data elements is shown with reference to FIGS. 12–14. In this embodiment, the four data elements of each set are assumed to be packed into individual sources such as Source1 and Source2 illustrated in FIG. 13a. Because all of the four data elements of each set are packed into the two sources at step 1202, only a single multiply-add instruction is required for multiplying and adding each subset of the sets. This is shown in FIG. 13a.

Subsequently thereto, at steps 1204 and 1206, the high result and the low result of the multiply-add instructions are unpacked. The results of these operations are shown in FIGS. 13b and 13c to generate two intermediate results, result 2 and result 3. Note that either of these operations may be performed in any order as long as they are performed before the final add at step 1208. Subsequent to the unpacking of the two intermediate results, result 2 and result 3 at step 1208, the results of the unpack operations are added to form the accumulated value. The results of this operation are shown in FIG. 13d. Thus, the second embodiment shown in these figures multiplies and adds two sets of four elements together which have been packed into single memory locations or registers, and the result is provided in an unpacked state in an accumulated value, result 4, as shown in FIG. 13d.

FIG. 14 illustrates the stages of operations which are required in this second embodiment of the four element per set case. For example, in a first stage 1402, the multiply-add operation is performed upon the four elements stored in each of the sources 1402. An intermediate result is generated 1404 which comprises the results of multiplying and adding each of the pairs of elements comprising the two four element sets. Subsequently thereto, the high and low portions of the intermediate result 1404 are unpacked to generate the two second unpacked intermediate results 1406. Subsequently thereto, the two unpacked intermediate results 1406 are added to form the final accumulator 1408.

Multiplying and Accumulating Sets Comprising Four or Greater Elements

Figure 15:
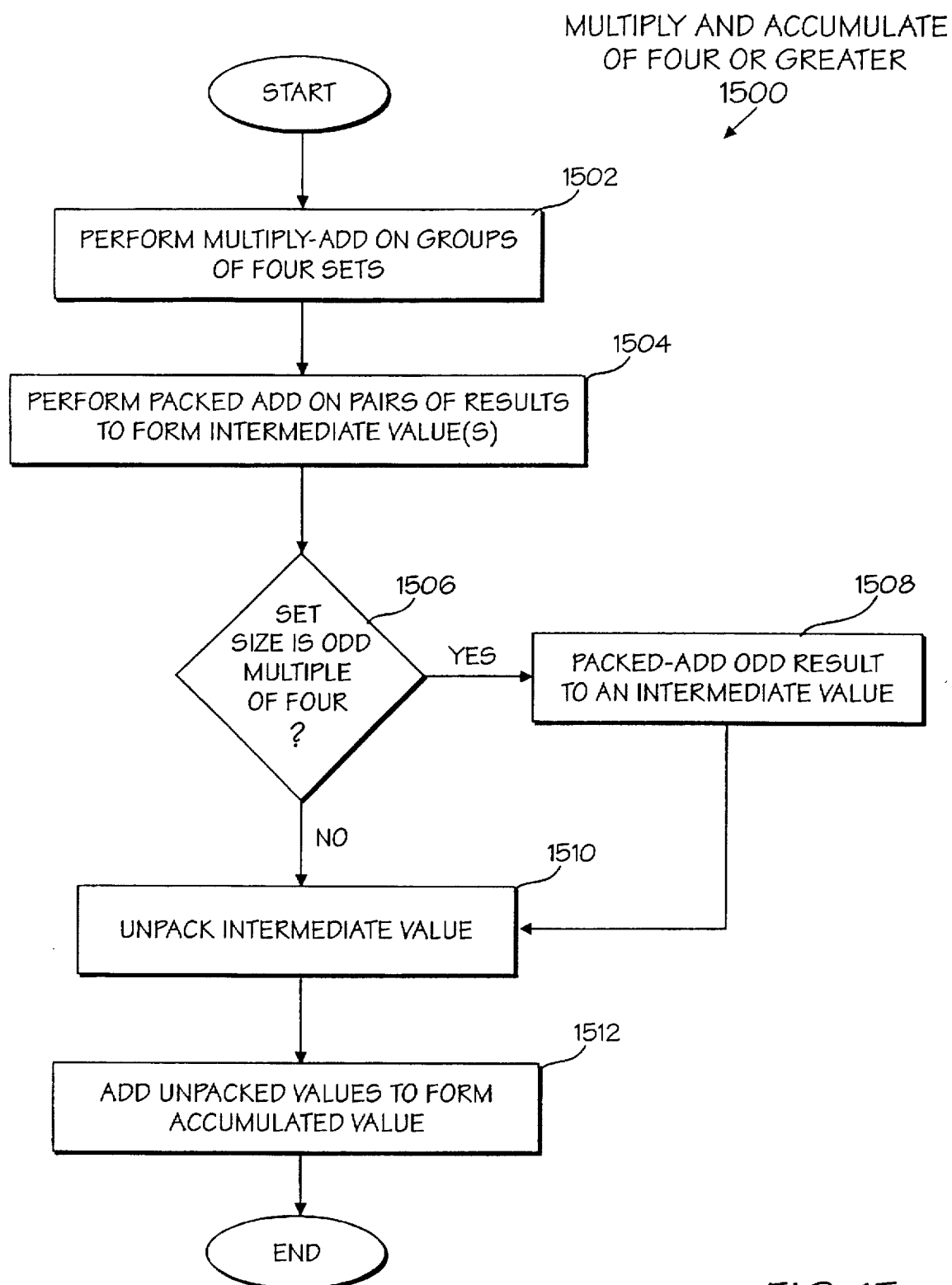

A process for multiplying and accumulating two sets comprising four or greater elements is illustrated with reference to FIGS. 15–18. The method 1500 illustrated in FIG. 15 is especially useful for multiplying/accumulating sets wherein each of the sets has eight or greater elements and the number of elements in each set is a multiple N of four (The number of packed data elements per source). FIGS. 16a–18 illustrate examples.

Figure 17:
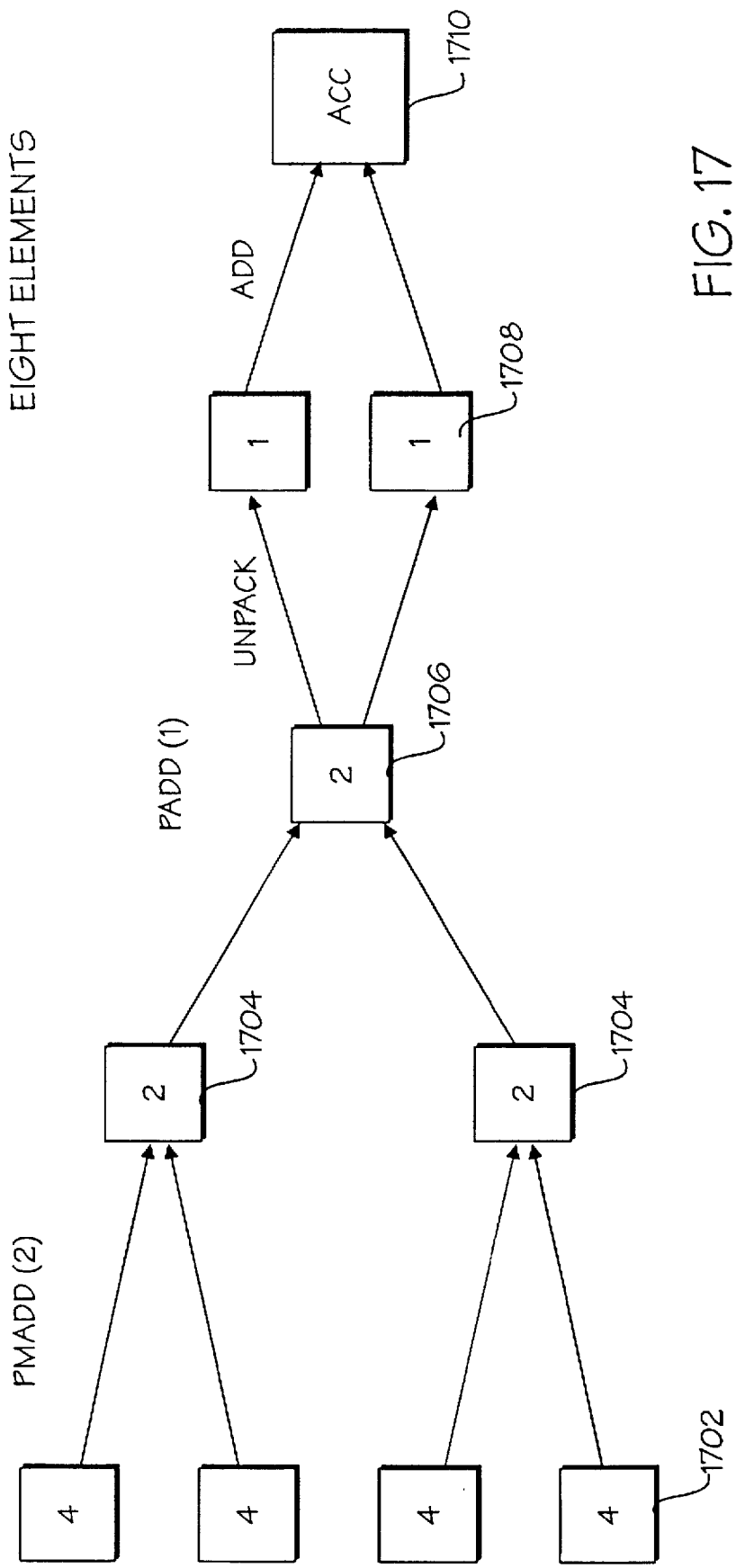

The process 1500 commences at step 1502 wherein each of the groups of four of the source data set have the multiply-add instruction performed upon them. These may be performed in parallel as shown in FIG. 17 wherein two sets of four data elements each are multiplied and added at stage 1702, because there are no data dependencies. As shown in FIGS. 16a and 16b, portions of the sets of elements are stored in four sources—Source1, Source2, and Source3 and Source4. Each pair of sources have separate multiply-add instructions performed upon them in order to generate the intermediate results, result 1 and result 2.

Subsequently thereto, at step 1504, packed-add operations are performed upon pairs of the results to form second intermediate value(s). These packed-add operations are performed upon pairs of intermediate results from the packed-add operations until there is only one intermediate result containing two packed data sources. For example, in the eight element case, the results of the multiply-add operations result 1 and result 2 as shown in FIG. 16c are added to form the intermediate result, result 3. This is also shown in FIG. 17 wherein the two results 1704 are packed-added together to form the intermediate result 1706. At step 1506, it is determined whether the set size is an odd multiple N of four. If so, then the odd result of the multiply-add operation is added into the final accumulated sum. This is performed at step 1508. An example of set size having an odd multiple of four is illustrated in FIG. 18.

After the performance of the packed-add instruction(s) at steps 1504, 1506 and 1508, if required, the intermediate value is unpacked at step 1510. This includes the separate unpacking of both the high and low portions of the intermediate result as shown in FIGS. 16d and 16e. Thus, the single intermediate result 1706 is unpacked into high and low portions 1708. Subsequent to the unpacking of the high and low portions of the intermediate result 1706, the unpacked values 1708 are then added using an unpacked-add operation at step 1512 to generate the resulting accumulated value 1710. This operation is shown in FIG. 16f.

Note that performance advantages using this method are achieved over prior art methods of multiplying and accumulating numbers because an intermediate accumulator is not required at every stage of operation. There are also no data dependencies among many of the intermediate values in the two sets during intermediate operations prior to formation of the accumulator. For this reason, operations may be performed in parallel and additional performance increases are realized over prior art techniques which require sequential operation. This method also requires execution of fewer instructions than multiply and accumulate methods in the prior art.

Figure 18:
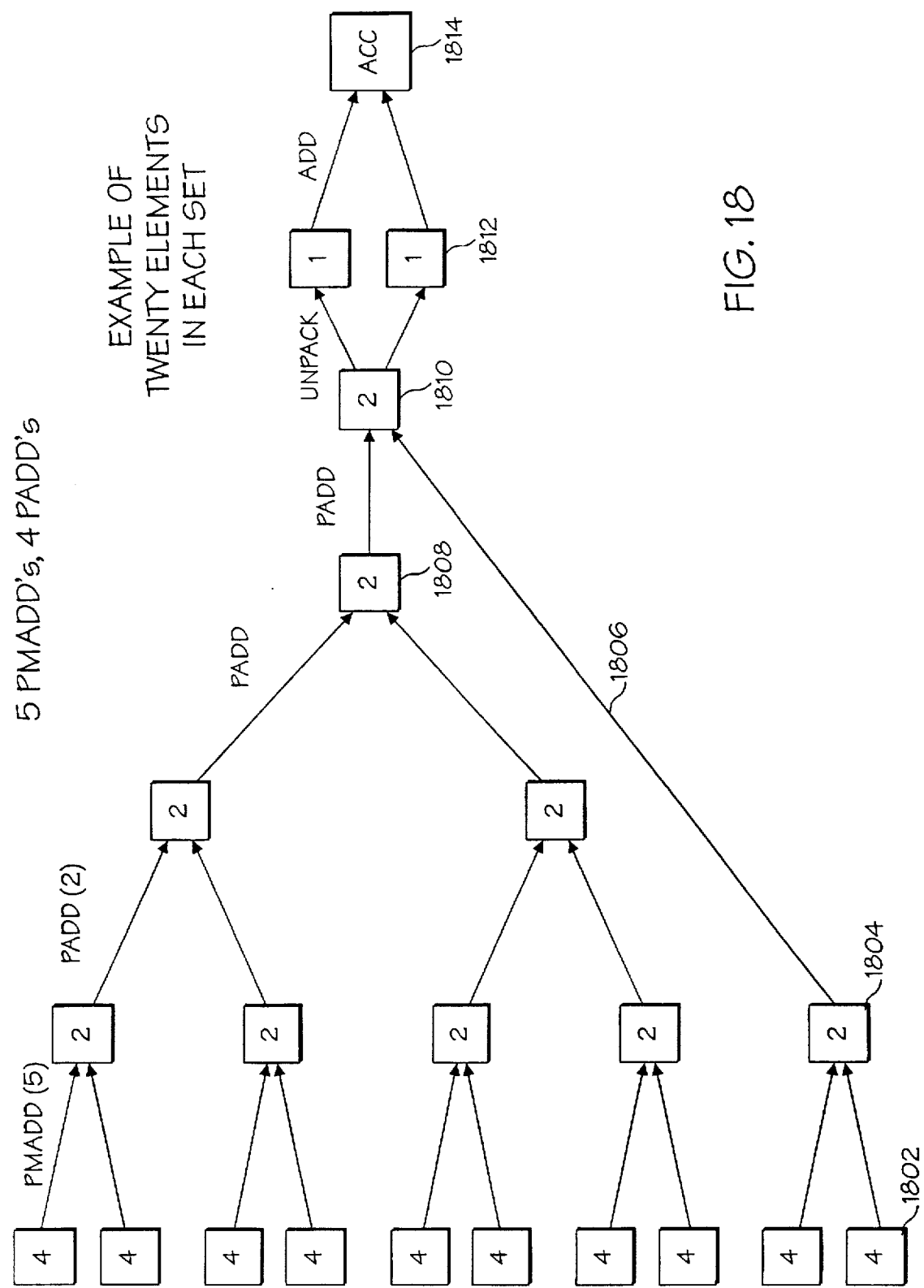
Figure 20:
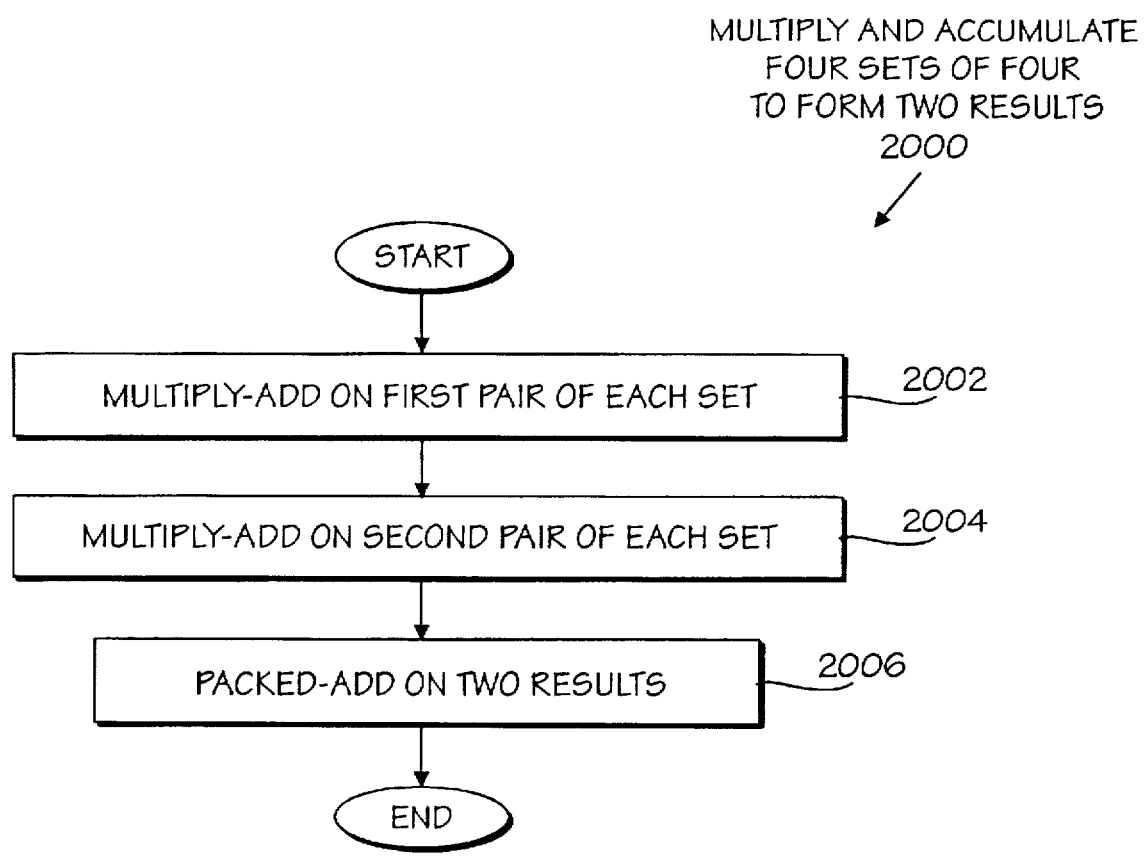

Another example of the application of the process 1500 of FIG. 15 is shown in FIG. 18. This shows a multiply/accumulate of two sets of twenty data elements—an odd multiple N=5 of four packed elements per source. Thus, the step 1506 will yield a positive result and step 1508 will need to be performed in order to generate the final intermediate value used for generation of the accumulator. As shown in FIG. 18, N=5 multiply-add operations are performed upon the groups of four packed elements 1802 from the two sets. This generates an odd number 5 of intermediate results 1804 which then have the packed-add operations performed upon them. At stages 1806 and 1808, pairs of intermediate results are summed by packed-add operations on pairs of the resulting packed data elements for the two sets. Subsequently thereto, the remaining odd intermediate result of the multiply/add operation is summed with the remaining intermediate results 1808 to form packed value 1810. The value 1810 is then unpacked into high and low portions 1812. An unpacked-add is then performed upon the final intermediate result data 1812 to form the accumulator 1814.

Note that in the examples of FIGS. 17 and 18, there is a relationship between the multiple N and the number of multiply-add and packed-add operations which are performed in these multiply and accumulate methods. For example, in FIG. 17 wherein N=2, two (N) multiply-add operations and a single (N−1) packed-add operation are performed. The same relationship holds for other values of N such as illustrated in FIG. 18.

Thus, in conclusion, using the above methods, two sets of data elements which require multiply and accumulation can be performed with the resultant performance increases using the multiply and add instruction as disclosed above, resulting in a net increase in performance over prior art methods which use multiply/accumulate instructions known in the prior art.

Multiply and Accumulate of Multiple Sets Concurrently

FIG. 19 through 21c show examples of multiply and accumulating of four sets of values. FIG. 19 illustrates an embodiment which is used for multiplying and accumulating four sets of elements wherein each of the sets includes two data elements. Thus, for example as shown in FIG. 19, two sources—Source 1 and Source 2 each comprising two sets of two values may be multiplied and added together resulting in a net multiply and accumulation of each of the two members of each of the two sets. These two results are then put into a single packed result, result 1.

FIGS. 20 and 21a–21c show the results of multiplying and accumulating four sets of four data elements into two results. For example, process 2000 starts at 2002 wherein the first pair of each set of data elements are multiply-added together to form a first intermediate result. This is shown in FIG. 21a wherein the elements in sets A and B are multiplied-added together and the elements in C and D are multiplied-added together. At step 2004, the second pair of each set are multiply-added together to form a second intermediate result. This is shown in FIG. 21b. Subsequent thereto, a packed-add is performed upon the two intermediate results at step 2006, in order to generate the resulting value, result 6, which comprises the two packed results of the two pairs of sets of data elements. The final accumulation is thus performed in the packed-add operation to generate the results in packed form.

Thus, using the above techniques, a variety of methods for performing multiply and accumulate operations upon various sets of data comprising various numbers of elements may be performed. Because of the advantages of lack of data dependencies among intermediate sets of values used by the multiply-add instruction, the lack of an accumulator, except at the final stage(s) of the process, substantial performance increases are realized over multiply/accumulate operations in the prior art. In this manner, the described multiply-add operation herein can be used to improve the performance of multiply and accumulate operations.

SIGNAL PROCESSING

The above-described embodiments of multiply-add to perform multiply-accumulate operations is especially useful in systems which perform signal processing. This signal processing may include the processing of video, audio, analog data (e.g., modem) or other signal data. Although audio and video data are set forth as an example, it can be appreciated by one skilled in the art that signal processing using multiply-accumulate operations may be performed in a large number of applications, and may also be used for processing input signal data as well as output signal data.

An example of a signal processing system and application is shown in FIG. 22. For example, system 100 may be configured to perform signal processing, such as video or audio compression upon input signals received from either video camera 128 and/or microphone 129. It may also be used to generate input or output signals for or from communication device 129, for example, in a modem pump application. System 100 may include speakers 127 and display 121 to present the results of the signal processing to the local user. In this implementation, signal processing may include video and/or audio compression which comprises a receiving stage 2202 which performs digitizing and/or other conversion of the analog signals received from the input devices to digital format for further processing.

After reception and digitizing, if any, of the input signal at stage 2202, the data may be compressed into a format which is more suited for storage within computer system 100 and/or transmission. This takes place at stage 2203. Subsequently thereto, the data may either be locally stored, for example, in data storage device 107, or, alternatively, transmitted to a second computer system such as 2221 shown in FIG. 22. This transmission and/or storage may be performed at a transmission and/or storage stage 2204. For example, the data may be transmitted over a transmission medium 2250 to a second computer system 2221 via communication device 129.

System 2221 comprises a similar sequence of stages 2207 through 2209 which perform operations which complement stages 2202 through 2204. Thus, the system includes a receiving stage 2207, a decompression stage 2208, and a display and/or playback stage 2209. Note that in other applications, such as modems or other data processing applications, the display/playback stage 2209 may be replaced by a similar stage which forwards the data on the appropriate application in the system for processing, such as a telecommunications application or other program operative in the second computer system 2221.

Some examples of the signal processing applications in which the multiply-accumulate operations described above may be used are now described in detail, however, it can be appreciated by one skilled in the art that other signal processing applications which require multiply-accumulation technique may be performed using the described multiply-add and packed-add operations above along with their corresponding advantages.

One application of the multiply-accumulate operations described above include various operations performed at the compression stage 2203 of system 100 illustrated in FIG. 22. Compression is used for a wide variety of technologies, including those to reduce redundancy in both the spatial and temporal domains in all forms of compression. These include, but are not limited to, image processing, video compression/decompression, audio compression/decompression, including speech. In the example of speech, speech compression is an important enabling technology for multimedia applications. Compressed speech requires less storage space and allows multimedia applications to include speech as part of their method of delivery.

Speech data is usually sampled at an 8 kilohertz rate with sample resolution between 8–16 bits per sample. This is a natural data type of the multiply-add and multiply-accumulate operations described above. The speech data may be divided into segments of 20–30 milliseconds and each segment is compressed according to various speech compression algorithms. Popular speech compression algorithms include: GSM, the European digital cellular telephone standard; True Speech™ from the DSP Group; G.728, an international standard; VSELP, another digital cellular telephone standard; CELP, a US DoD standard. Current state of the art speech compression algorithms can deliver compression ratio of 4:1 to 8:1 with very acceptable reproduced speech quality. Most of the current speech compression algorithms employed the analysis-by-synthesis linear prediction technique as the fundamental compression scheme.

In this technique, a speech frame of appropriate length is modeled as an all poles digital filter being excited by a sequence of pulses. The filter's coefficients are designed to approximate the vocal tract characteristics during the speech frame and the excitation sequences are sued to model the glottal excitation. Linear prediction technique encompass this entire process of modeling the vocal tract and glottal excitation. The adaptive process of perceptually measuring the reproduced speech quality and updating the modeling parameters is called the analysis-by-synthesis technique.

Compression is achieved by transmitting or saving only the digital filter coefficients and some reduced form of excitation. In its most rudimentary form, the excitation is stored as either a pulse train occurring at a given pitch period or an indication to use a random number generator as the source to the filter. This form of excitation produces intelligible but synthetic sounding speech. Current algorithms will also transmit some form of residual signal to be used as the filter excitation.

The entire speech compression process involves many operations. Some of the more computational intensive and are common to many of the operations are the computation of correlation lags, filtering of speech signal, and distance calculations. The rest of this section will illustrate the use of the packed data instructions in these computations.

Autocorrelation

Correlation computation are used as the front end calculation to the Levinson-Durbin Recursion, one of the techniques to obtain the linear prediction coefficients. It is also used as a method to detect periodicity in a waveform. When the correlation lags are computed against a signal sequence, the computation is normally called the autocorrelation computation.

As previously discussed, autocorrelation has a wide variety of applications, including, but not limited to, speech compression. Providing certain signal criteria is met, M autocorrelation lags of a sequence can be computed as shown in the following example sequence of C code:

TABLE 5

```
void autocorr( short *Vect, long *Lags, long nLags, long nVect)
{
int i,j;
for(i=0; i<nLags; i++) {
Lags[i] = 0;
for(j=0; j<nVect; j++) Lags[i] += Vect[j] * Vect[i+j];
}
}
```

The autocorrelation algorithm shown in Table 5, above, may invoke the multiply-accumulate algorithm which uses the packed multiply-add and packed-add operations as described above. An assembly code implementation which is optimized for a system employing a processor having these operations is shown below. The autocorrelation technique is highly vectorizable and will benefit greatly from the parallelism of the packed-data operations. Using packed-data operations, four multiply-accumulate operations can be performed in parallel, speeding up the operation substantially. The following assembly code shows the autocorrelation using the packed data instructions.

TABLE 6

```
TITLE autocorr.asm
;
; Purpose :   Compute M autocorrelation lags of a 16-bit vector with
;             length N
;
; Usage:      Call from C program
;                void autocorr(short *Data, long *lags, long M, long N);
; Note:       This code assume that N is exactly divisble by 4, if
;             this is not the case, then additional code need to be
;             added to take care of the left over calculations.
;
.486P
.MODEL FLAT, C
.CODE
INCLUDE SIMD.INC
autocorr PROC NEAR
        mov     ecx, 4[esp]
        mov     eax, 16[esp]
        push    ebx
        push    edx
        push    esi
        push    edi
        shr     eax, 2
        mov     edi, 28[esp]            ; edi = M
        mov     esi, eax                ; esi = N / 4
        xor     ebx, ebx                ; ebx = i
lag_calc:
        lea     eax, [ecx+ebx*2]
        pxor    mm7, mm7
        movq    mm0, DWORD PTR [ecx]
        xor     edx, edx                ; edx = j
        movq    mm1, DWORD PTR [eax]
dp_calc:
        inc     edx
        pmaddwd mm1, mm0
        movq    mm0, DWORD PTR [ecx+edx*8]
        paddd   mm7, mm1
        movq    mm1, DWORD PTR [eax+edx*8]
        cmp     edx, esi
        jl      dp_calc
end_dp_calc:
        ; if N is not exactly divisble by 4 then extra code need to be
        ; inserted here to take care of the last 1 to 3 calculations.
        movq    mm6, mm7
```

TABLE 6-continued

```
        psrlq      mm7, 32
        paddd      mm6, mm7
        mov        eax, 24|esp|
        movdf      DWORD PTR |eax+ebx*4|, mm6
        inc        ebx
        cmp        ebx, edi
        jl         lag_calc
fin:
        pop        edi
        pop        esi
        pop        edx
        pop        ebx
        ret
autocorr ENDP
END
```

Note that in this block of assembly code, certain mnemonics refer to those used in the Intel Architecture processor. In addition, the mnemonics preceded by a p (e.g., pmaddwd, paddd, and psrlq) refer to the packed data operations. Operands preceded by the prefix "mm" refer to each of the aliased packed data registers 209 in the register file 150. The remaining mnemonics and references specify registers and instructions in the Intel Architecture processor.

The main calculation loop in the assembly routine is the dp_calc loop where the multiply-accumulation takes place. The instruction pmaddwd (packed multiply-add word) performs four 16-bit multiplications on 4 elements of the vectors and partially adds the result together producing two 32-bit results in the 64-bit register mm1. The instruction paddd (packed-add doubleword) performs two 32-bit accumulations of the partial result register mm1 to the register mm7. At the end of the dp_calc loop, the final result is formed by shifting the 64-bit register mm7 to the right by 32 bits thus aligning the upper 32-bit accumulator result with the lower 32-bit accumulator result. The final paddd instruction leaves the final result in its lower 32-bit. The movdf instruction stores the result to memory and the loop proceeds to the next lag calculation.

Note that the dp_calc loop can be unrolled a number of times to achieve a sustainable four 16-bit multiply-accumulate operation every 2 clock cycles when data is aligned and cached.

Figure 23A:
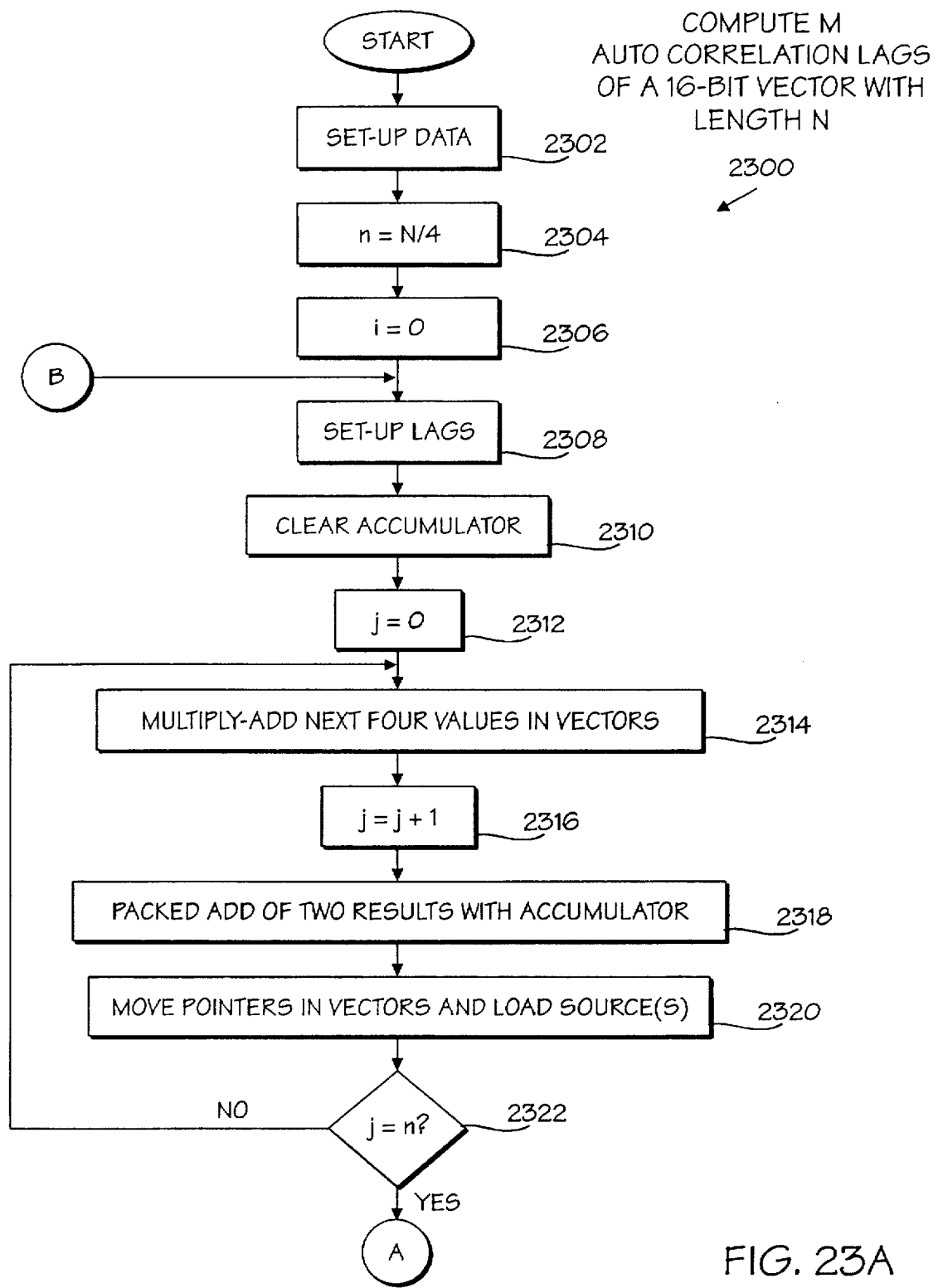
FIGS. 23a and 23b illustrate a method for performing M autocorrelation lags of a vector of length N representing input signal(s).
Figure 23B:
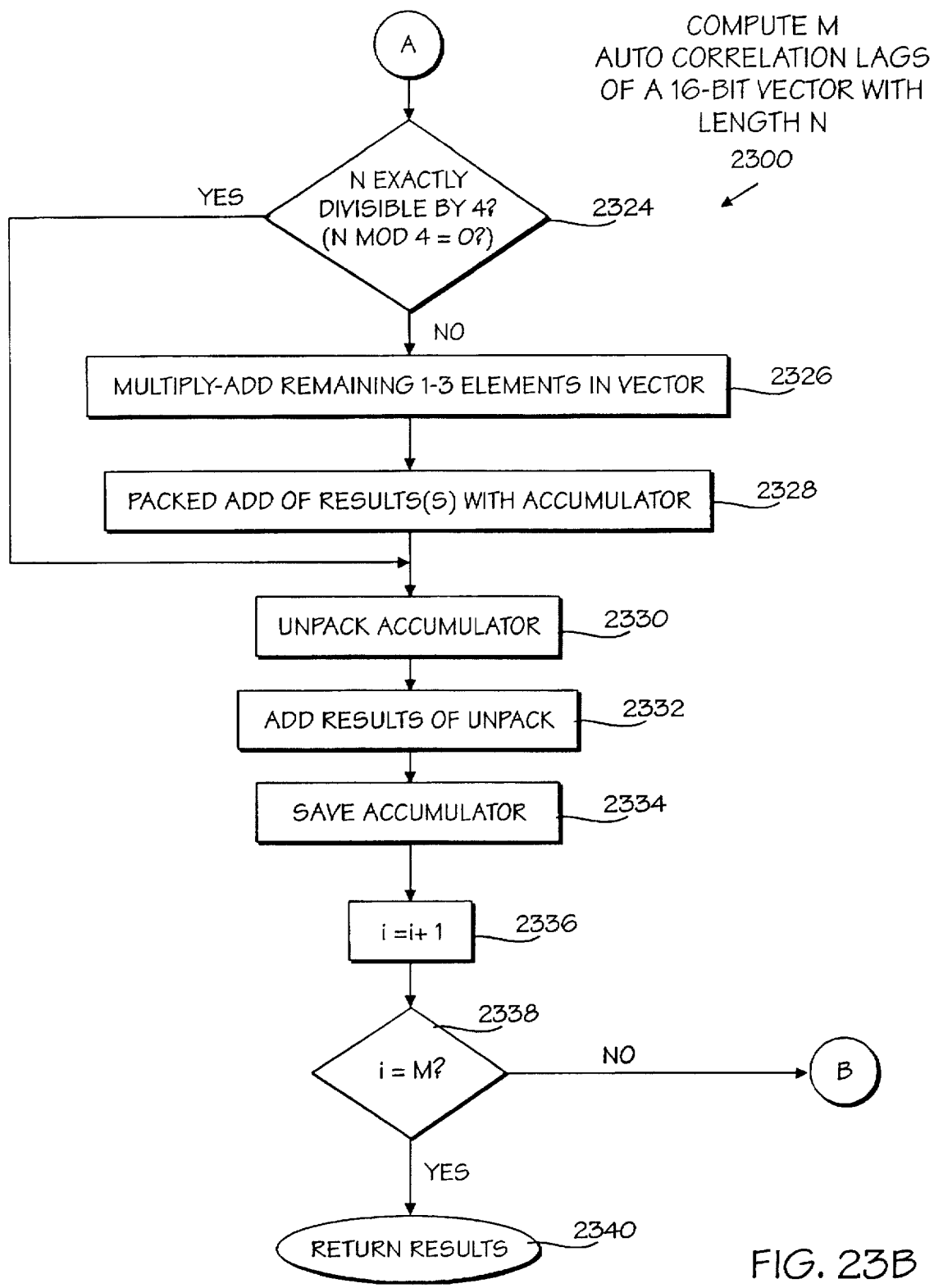

FIGS. 23a and 23b illustrate a method for autocorrelation similar to the code segment shown above. The process computes M autocorrelation lags of a 16-bit vector with a length N. The process commences at step 2302 wherein the data and pointers to elements in the vector are set up. Then, at step 2304, the value n is set equal to N/4. This is done, in the code segment, by using a shift operation. Note that the method may also be extended to handle circumstances in which the number of elements in the vector is not a multiple of four, however, extra code must be added in order to add the remaining values to the final accumulation value. At any rate, the value n is an integer representing the length of the vector N divided by 4.

At step 2306, the index i is set equal to 0, i, in the code segment, uses the Intel Architecture register ebx. At step 2308, the lags are set up. This is the code segment shown with the label lag_calc. Then, at step 2310, the accumulator is cleared. This may be performed using an XOR operation. Then, at step 2312, the index j is initialized for the multiply-accumulate loop at step 2312.

Then, the body of the multiply-accumulate loop, dp_calc, is performed at steps 2314 through 2322. First, at step 2314, a multiply-add of the next four values in the vectors as loaded in the registers mm1 and mm0 is performed at step 2314. Then, at step 2316, the index j is post-incremented. Subsequently thereto, a packed-add of the two results is performed with the accumulator. Then, at step 2320, the pointers in the vectors and the appropriate source(s) are reloaded for the next iteration of the dp_calc loop. Subsequently thereto, it is determined whether the index j is equal to n at step 2322. If not, the process continues and steps 2314 through 2322 repeat for the next four values. If j is equal to n (all groups of four elements in the vectors have been multiplied and accumulated) then the process continues as shown in FIG. 23b.

As shown in FIG. 23b, step 2324 determines whether the element size N of the vector is exactly divisible by 4. That is, whether N MOD (modulo) 4 equals zero. If so, then the remaining 1-3 elements in the vectors are multiply-added at step 2326. Subsequently thereto, the results of the 1-3 remaining elements from the vectors are packed-added at step 2328 with the contents of the accumulator. Thus, all of the elements in the two vectors, as of step 2330, have been multiply-added together.

Subsequent to step 2324 or step 2328, the two halves of the accumulator are unpacked at step 2330. At step 2332, the results of the unpack are then added together. The accumulator is then saved at step 2334 for this lag of the autocorrelator. Then, at step 2336, the index i is incremented, and the next lag, if any, of the autocorrelation can be computed.

It is determined at step 2338 whether the index i is equal to M. If so, step 2338 proceeds back to step 2308 to set up the lags for the next iteration of the autocorrelator. Thus, steps 2308 of FIG. 23a through step 2338 of FIG. 23b continue iteratively until the requisite number of lags M have been computed. Once all the requisite number of lags M have been computed, as detected at step 2338, the process is thus complete at step 2340 and the results of the auto-correlator can be returned to the routine which invoked the autocorrelator 2300.

Note that the code segment and the flowchart may differ in some respects, for example, post-increment versus pre-increment, or other implementation details, however, it can be appreciated by one skilled in the art that the appropriate modifications of the actual code and/or the process shown in the flowchart may be modified accordingly in order to accomplish similar results. Notwithstanding, signal processing of input signals using a signal processing method such as the autocorrelation shown have advantages over prior art multiply-accumulate operations.

Digital Filter

Yet another application in a system employing multiply-accumulate operations is digital filtering. Digital filtering is an important operation in signal processing also including, but not limited to, speech processing. A first type of digital filter which may employ multiply-accumulate operations is known as a finite input response (FIR) filter in which one implementation is shown in the C code segment as below:

TABLE 7

```
void FIR( short *Data, short *Coeff, short *taps, long Order,
long Datalength)
/* inplace FIR filtering                                    */
/* It is assumed that the data coefficients are already scaled */
/* appropriately.                                           */
{
int i,j,temp;
```

TABLE 7-continued

```
for(i=0; i<Order; i++) taps[i]= 0;
for (i=0; i<Datalength; i++) {
    taps[0] = Data[i];
    /* dot product calculation loop */
    temp  = 0;
    for(j=0; j<Order; j++)
        temp += taps[j] * coef[j];
    /* scale data appropriately here */
    Data[i] = range_adjust(temp);
    for(j=Order-1; j>0; j—)
        taps[j] = taps[j-1];
}
}
```

One application in which the digital filter may be used is a modem data pump which operates on complex numbers.

An FIR filter that operates on complex numbers can be frequently found in digital signal processing applications, such as V.32 bis and V.34 class modem data pumps. As shown in the equations below, an output data sample from an FIR filter is calculated by accumulating an iterative series of multiply operations of the stored data from filter delay line taps by the corresponding filter tap coefficients.

$$y(n) = \sum_{k=0}^{N-1} c(k) * x(n-k)$$

Where:
N=filter length
c(k)=filter coefficients
x(n-k)=past and present input data samples
y(n)=present output data sample To perform this in complex arithmetic, the real and imaginary components of the result are calculated separately. The complex form of this is shown below:

$$y(n).real = \sum_{k=0}^{N-1} (c(k).real * x(n-k).real - c(k).imag * x(n-k).imag)$$

$$y(n).imag = \sum_{k=0}^{N-1} (c(k).real * x(n-k).imag + c(k).imag * x(n-k).real)$$

The packed multiply-add operation is well suited for complex multiplication. The functionality of packed multiply-add word instruction allows for four 16-bit×16-bit multiplies and two 32-bit adds to be performed in parallel. By proper formatting of the input data and coefficients, a complete complex multiply operation for the real and imaginary pair can be computed with one pmaddwd instruction. The resulting packed 32-bit components can then be optionally scaled (for additional overflow prevention) using the psrad instruction (packed shift right with saturation), and then summed to a packed complex accumulator using paddd (packed-add doubleword).

Figure 24:
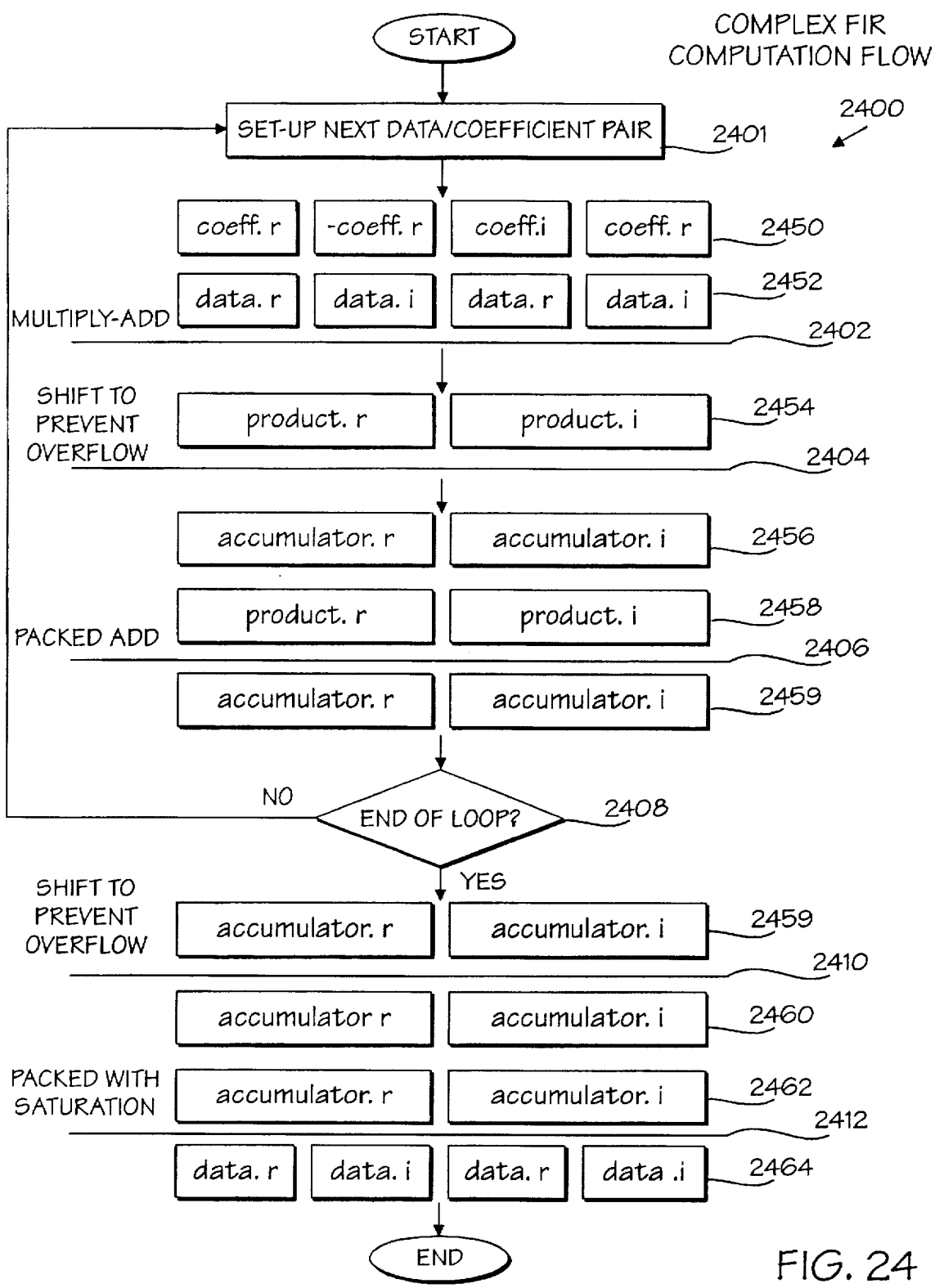
FIG. 24 illustrates a method for performing a complex FIR digital filter on input signals.

The computational flow of the inner loop for a complex FIR filter using packed-data instructions is shown in FIG. 24. The diagram assumes the input data and coefficients are already formatted to a computationally efficient form. In an actual implementation, the input data formatting would have to only be done once for each incoming data sample, while the filter coefficients could be formatted during initialization or by the adaptive update routine (if one exists). The data output format shown by the flow in FIG. 24 is identical to the input data format.

The example in FIG. 24 assumes the input data 2452 is of the precision S.15 (fractional decimal format of 1 sign bit and 15 bits behind the decimal point). The complex input data 2452 and filter coefficient data 2450 is also replicated in the high doubleword to facilitate packed arithmetic. Note that the coefficient data is purposely not symmetrical. This formatting is necessary to make direct use of the pmaddwd format for a complex multiply.

At step 2401, the data and coefficient pairs 2450 and 2452 are set up for calculation. When an input data sample 2452 and corresponding coefficient 2450 are multiplied using a packed multiply-add at step 2402, the precision of the resulting product 2454 ends up as S1.30. This extra bit to the left of the decimal place is not uncompensated for immediately, since the implicit adds as part of the packed multiply-add operation 2402 could have resulted in a carry. Subsequent to the multiply-add 2402, a packed shift right with saturation operation 2404 is performed upon the product 2454 to prevent overflow. The shifted product 2458 and the accumulator 2456 are added together at step 2406 to generate the new accumulator 2459. It is then determined whether any other iterations of the complex multiply-add need to take place at step 2408. If so, step 2401 is repeated to set up the data for the next coefficient/data pair and steps 2401–2408 repeat.

A second explicit right shift 2410 is performed using the psrad instruction prior to adding the result to the accumulator at step 2412 to further increase the number of bits for overflow protection from 1 to 2 (S2.29). This may not be necessary for specific applications but is shown in this embodiment for robustness.

When the iterative portion (steps 2401–2408) of this code is complete, the resulting accumulator pair 2458 is shifted to the right at step 2410 to generate 2460 in order to place the most significant portion in the low word, in preparation for packing back to 16-bits using the packed with saturation at step 2412. Implicit in this final right shift is a left shift by 2 positions (which is why the shift count is 14 instead of 16) to restore the original precision of the input data (S.15).

As part of the precision conversion from 32-bits back to 16-bits, the pack operation with saturation performs a secondary function of saturating the result to a signed 16-bit value in the event that the final accumulation in either the real or imaginary portion overflowed.

To maximize the throughput of the computational flow shown in FIG. 24 in a multi-pipeline processor, such as the Pentium® brand processor which has added packed data capability, the instruction sequence can be scheduled properly to minimize data dependencies. Software pipelining may be used. A sufficient number of multiply-accumulate iterations are unrolled to minimize the overhead of the loop code, and then for the duration of each packed multiply-add operation stage, instructions related to the previous and next stage packed multiply-add are issued that do not depend on the current stage result. As a result of this technique, in this example a 2 clock throughput per complex multiply-accumulate operation can be achieved within the inner loop.

TABLE 8

Complex FIR filter code example

```
; Complex FIR filter routine using packed data instructions
;
; mm0-mm3        used as for scratch registers
; mm4            Filter accumulator
; ebx            inner loop iteration count
; edi            input data pointer
; esi            coefficient pointer
;
; Code is shown below in 2 columns to illustrate how the code is scheduled
; in the U & V pipes.
;
; U-pipe                          V-pipe
;
; initialize pointers and loop count
MOV      esi,COEFF_ADDR    MOV ebx, (FSIZE-2)*8
MOV      edi,DATAIN_ADDR
; unrolled header code that primes the inner loop
MOVQ     mm0, [ebx+esi]    PXOR mm4,mm4       ;read C0           :clear acc
PMADDwd  mm0, [ebx+edi]                       ;mm0= C0*D0
MOVQ     mm1, [ebx+esi+8]                     ;read C1
PMADDwd  mm1, [ebx+edi+8]                     ;mm1= C1*D1
; Unrolled code inner loop code
INNERLOOP:
MOVQ     mm2, [ebx+esi+16]  PSRAd mm0,1       ;read C2           :C0*D0 >> 1
PMADDwd  mm2, [ebx+edi+16]  PADDd mm4,mm0     ;mm2= C2*D2        :mm4+= C0*D0
MOVQ     mm3, [ebx+esi+24]  PSRAd mm1,1       ;read C3           :C1*D1 >> 1
PMADDwd  mm3, [ebx+edi+24]  PADDd mm4,mm1     ;mm3= C3*D3        :mm4+= C1*D1
MOVQ     mm0, [ebx+esi+32]  PSRAd mm2,1       ;read C4           :C2*D2 >> 1
PMADDwd  mm0, [ebx+edi+32]  PADDd mm4,mm2     ;mm0= C4*D4        :mm4+= C2*D2
MOVQ     mm1, [ebx+esi+40]  PSRAd mm3,1       ;read C5           :C3*D3 >> 1
PMADDwd  mm1, [ebx+edi+40]  PADDd mm4,mm3     ;mm1= C5*D5        :mm4+= C3*D3
SUB      ebx,32             JNZ INNERLOOP     ;loop thru entire filter
; unrolled tail code outside of inner loop
PSRAd    mm0,1                                ;C4*D4 >> 1
PADDd    mm4,mm0            PSRAd mm1,1       ;mm4+= C4*C4       :C5*D5 >> 1
PADDd    mm4,mm1                              ;mm4+= C5*D5
; format and store the accumulator
PSRAd    mm4,14             MOV eax,DATAOUT_ADDR ;shift dword down
PACKSSdw mm4,mm4                              ;pack to word format
MOVQ     [eax],mm4                            ;store filter output
end
```

Note further the multi-columnar code listing set forth above refers to the separate U and V pipes which are used in some two-pipeline processors (e.g., the Pentium® brand processor).

Dot Product

Both of the autocorrelation and digital filter examples set forth above use a dot product for performing the signal processing. An example of a dot product is shown in the following code segment:

TABLE 9

```
TITLE dp.asm
;
; Purpose:    Compute dot product of two 16-bit vectors of length N
;             using MMx instructions
;
; Usage:      Call from C program
;             int dot_product( short *sPtr1, short *sPtr2, int length);
;
.486P
.MODEL FLAT, C
.CODE
INCLUDE SIMD.INC
dot_product PROC NEAR
        mov     ecx, 4[esp]
        mov     eax, 8[esp]
```

TABLE 9-continued

```
        push    ebx
        push    edx
        push    esi
        mov     ebx, 24[esp]
        cmp     ebx, 0
        jle     abrt
        xor     esi, esi
        pxor    mm7, mm7
        movq    mm0, [ecx]
        movq    mm1, [eax]
        cmp     ebx, 4
        jl      do3
        shr     ebx, 2
start_loop4:
        pmaddwd mm1, mm0
        inc     esi
        paddd   mm7, mm1
        movq    mm0, [ecx+esi*8]
        movq    mm1, [eax+esi*8]
        cmp     esi, ebx
        jl      start_loop4
end_loop4:
        shl     esi, 2
        mov     ebx, 24[esp]
        cmp     ebx, esi
        je      finish
        sub     ebx, esi
do3:
        cmp     ebx, 3
```

TABLE 9-continued

```
        je      shift1
        cmp     ebx, 2
        je      shift2
shift3:
        psllq   mm0, 48
        psllq   mm1, 48
        jmp     end_shift
shift2:
        psllq   mm0, 32
        psllq   mm1, 32
        jmp     end_shift
shift1:
        psllq   mm0, 16
        psllq   mm1, 16
end_shift:
        paddwd  mm1, mm0
        pmaddd  mm7, mm1
finish:
        movq    mm6, mm7
        psrlq   mm7, 32
        paddd   mm6, mm7
        movdf   eax, mm6
        pop     esi
        pop     edx
        pop     ebx
        ret
;
; for the pathological cases of length <= 0
;
abrt:
        xor     eax, eax
        pop     esi
        pop     edx
        pop     ebx
        ret
dot_product ENDP
END
```

Similar to the autocorrelator, the main calculation loop in the dot_product function, start_loop_4 computes four 16-bit multiply-accumulate operations per iteration with the results accumulated in the two halves of the accumulator register mm7. The final result in obtained by adding the two halves of the register mm7 as shown at the label finish. The section of code between the label end_loop and the label finish handles the case where there are leftover calculations (e.g., from one to three). Where appropriate, it may be beneficial to pad the vector length to be an exact multiple of four to avoid the overhead of performing these leftover calculations as they tend to suffer from branch misprediction. Otherwise, extra calculations must be performed for the one to three remaining elements of the vector.

Again, this function can benefit from the traditional optimization technique of loop unrolling to achieve a sustainable throughput of four multiply-accumulate every 2 clock cycles.

Figure 25:
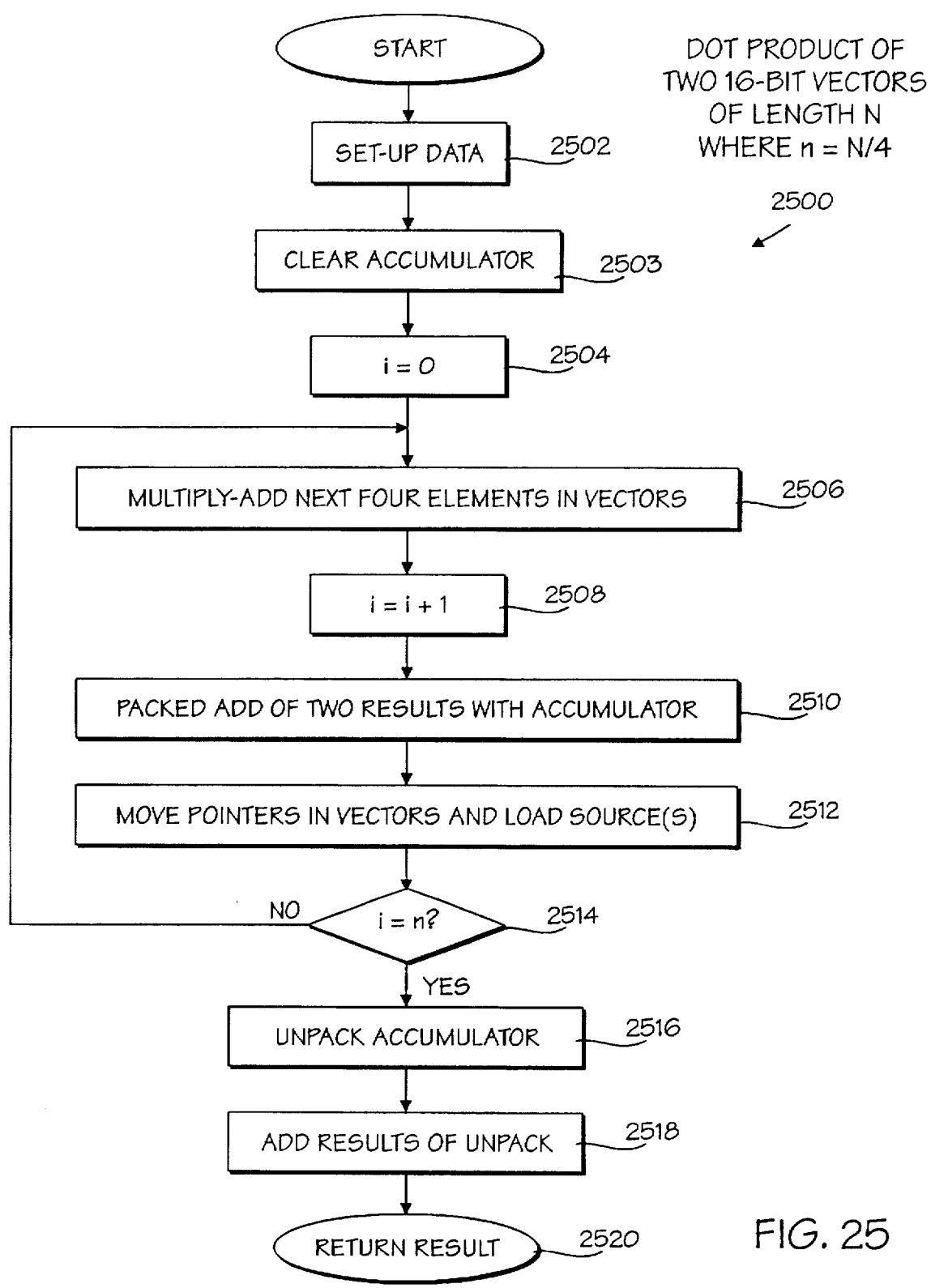
FIG. 25 illustrates a method for performing a dot product of two 16-bit vectors of length N.

FIG. 25 illustrates a generalized method for performing the dot product of input signal using multiply-accumulate operations. In this example, it is assumed that the two 16-bit input vectors are of length N, wherein N is exactly divisible by four. That is, there is an integer n wherein n=N/4.

Process 2500 of FIG. 25 starts at step 2502 wherein all of the input data of the routine are set up. Like the other code segments set forth above, it is assumed that the data samples are 16 bits in length and are aligned at word boundaries. If not, other setup operations may need to be performed at step 2502. Pointers referencing the data may be set up, wherein the pointers are used for referencing sources during the main processing loop shown as steps 2506 through 2514. Before entry into the main processing loop, the accumulator is cleared at step 2503. As shown in the code segment, this is mm7. Subsequently thereto, the index i is initialized at step 2504, which, in the code segment, uses the Intel Architecture register esi.

Subsequent to the initial setting up of the data and initialization of the accumulator and the index i, the main processing loop, steps 2506 through 2514, is performed. The first step 2506 in process 2500 is to multiply-add the next four elements in the vectors. Then, the index i is post-incremented at step 2508. Subsequently, a packed-add of the two results is performed at step 2510 with the value stored in the accumulator. Then, the references to the source elements in the vectors are moved and the source(s) are loaded, if required, at step 2512. At step 2514, it is determined whether the i=n. If so, then all elements in the vectors have been multiply-accumulated together. If not, then the main calculation loop 2506 through 2514 continues.

Subsequent to the determination that all N elements in the vectors have been multiply-accumulated, as detected at step 2514, the process continues at step 2516 wherein the accumulator is unpacked into its two 32-bit resulting portions. Subsequently thereto, the two 32-bit results in the upper and lower halves of the accumulator are added together to form the final result at step 2518. The result can then be returned to a process invoking the dot product routine 2500 at step 2520.

Thus, using the above examples, signal processing of input signals received from any number of input devices, such as video, audio, or other input signal data, may be performed by using multiply-accumulate operations which employ the packed multiply-add operation.

Alternative Embodiments

While the described embodiment uses 16-bit data elements to generate 32-bit data elements, alternative embodiments could use different sized inputs to generate different sized outputs. In addition, while in the described embodiment Source1 and Source2 each contain 4 data elements and the multiply-add instruction performs two multiply-add operations, alternative embodiment could operate on packed data having more or less data elements. For example, one alternative embodiment operates on packed data having 8 data elements using 4 multiply-adds generating a resulting packed data having 4 data elements. While in the described embodiment each multiply-add operation operates on 4 data elements by performing 2 multiplies and 1 addition, alternative embodiments could be implemented to operate on more or less data elements using more or less multiplies and additions. As an example, one alternative embodiment operates on 8 data elements using 4 multiplies (one for each pair of data elements) and 3 additions (2 additions to add the results of the 4 multiplies and 1 addition to add the results of the 2 previous additions). In another embodiment, source (s) could have packed therein two operands and the result of the multiply-add could be unpacked in a 64-bit result.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method for manipulating two sets of values the method comprising the steps of:

a) performing a packed multiply add on a first set of values packed into a first source and a second set of values packed into a second source to generate a packed intermediate result, said packed multiply add performed by a processor having a plurality of multipliers;

b) adding said packed intermediate result to an accumulator to generate a packed accumulated result in said accumulator;

c) unpacking said packed accumulated result in said accumulator into a first result and a second result; and d) adding said first result and said second result to generate an accumulated result.

2. The method of claim 1 wherein said step performing said packed multiply add with portions of said first set of values and portions of said second set of values to generate said packed intermediate result and said step of adding of said packed intermediate result to said accumulator to generate said packed accumulated result in said accumulator, are iteratively performed.

3. The method of claim 1 wherein said method includes performing a dot-product of said first set of values and said second set of values.

4. The method of claim 1 wherein said method includes performing an auto-correlation of said first set of values and said second set of values.

5. The method of claim 1 wherein said method includes performing a digital filter on said first set of values and said second set of values.

6. The method of claim 5 wherein said digital filter includes a finite impulse response (FIR) filter.

7. The method of claim 6 wherein said first set of values and said second set of values comprise complex values which each include a real and an imaginary portion.

8. A method for manipulating two sets of values the method comprising the steps of:

a) performing a packed multiply add on a first set of values packed into a first source and a second set of values packed into a second source to generate an intermediate result, said packed multiply add performed by a processor having a plurality of multipliers;

b) unpacking said intermediate result to generate a first and second result; and c) adding said first and second results to generate an accumulated result.

9. The method of claim 8 wherein said step performing said packed multiply add with portions of said first set of values and portions of said second set of values to generate said packed intermediate result, said step of unpacking said intermediate result to generate said first and second results, and said step of adding of said first and second results to generate said packed accumulated result, are iteratively performed.

10. The method of claim 8 wherein said method includes performing a dot-product of said first set of values and said second set of values.

11. The method of claim 8 wherein said method includes performing an auto-correlation of said first set of values and said second set of values.

12. The method of claim 8 wherein said method includes performing a digital filter on said first set of values and said second set of values.

13. The method of claim 12 wherein said digital filter includes a finite impulse response (FIR) filter.

14. The method of claim 13 wherein said first set of values and said second set of values comprise complex values which each include a real and an imaginary portion.

15. A computer-readable medium having stored thereon a plurality of sequences of instructions, said plurality of sequences of instructions including sequences of instructions which when executed by a processor having a plurality of multipliers, cause said processor to perform the steps of:

a) performing a packed multiply add on a first set of values packed into a first source and a second set of values packed into a second source to generate an intermediate result;

b) unpacking said intermediate result to generate a first and second result; and c) adding said first and second results to generate an accumulated result.

16. The computer-readable medium of claim 15 wherein said step performing said packed multiply add with portions of said first set of values and portions of said second set of values to generate said packed intermediate result, said step of unpacking said intermediate result to generate said first and second results, and said step of adding of said first and second results to generate said packed accumulated result, are iteratively performed.

17. The computer-readable medium of claim 15 wherein said sequences of instructions perform a dot-product of said first set of values and said second set of values.

18. The computer-readable medium of claim 15 wherein said sequences of instructions perform an auto-correlation of said first set of values and said second set of values.

19. The computer-readable medium of claim 15 wherein said sequences of instructions perform a digital filter on said first set of values and said second set of values.

20. The computer-readable medium of claim 19 wherein said digital filter includes a finite impulse response (FIR) filter.

21. The computer-readable medium of claim 20 wherein said first set of values and said second set of values comprise complex values which each include a real and an imaginary portion.

* * * * *